(12) United States Patent
Kimura

(10) Patent No.: US 9,507,999 B2
(45) Date of Patent: Nov. 29, 2016

(54) IMAGE PROCESSING APPARATUS AND PROGRAM

(71) Applicant: SONY CORPORATION, Minato-ku (JP)

(72) Inventor: Jun Kimura, Kanagawa (JP)

(73) Assignee: SONY CORPORATION, Tokyo (JP)

( * ) Notice: Subject to any disclaimer, the term of this patent is extended or adjusted under 35 U.S.C. 154(b) by 37 days.

(21) Appl. No.: 14/381,419

(22) PCT Filed: Apr. 25, 2013

(86) PCT No.: PCT/JP2013/002827
§ 371 (c)(1),
(2) Date: Aug. 27, 2014

(87) PCT Pub. No.: WO2013/179566
PCT Pub. Date: Dec. 5, 2013

(65) Prior Publication Data
US 2015/0125043 A1 May 7, 2015

(30) Foreign Application Priority Data

May 29, 2012 (JP) ................................. 2012-121555

(51) Int. Cl.
*G06K 9/00* (2006.01)
*G06F 3/01* (2006.01)
*H04Q 9/00* (2006.01)
*G06T 7/20* (2006.01)

(52) U.S. Cl.
CPC ........... *G06K 9/00355* (2013.01); *G06F 3/017* (2013.01); *G06T 7/20* (2013.01); *H04Q 9/00* (2013.01); *G06T 2207/10004* (2013.01); *G06T 2207/30196* (2013.01); *G06T 2207/30241* (2013.01); *H04Q 2209/30* (2013.01); *H04Q 2209/43* (2013.01); *H04Q 2209/84* (2013.01)

(58) Field of Classification Search
CPC ..... G06K 9/00355; G06F 3/017; G06T 7/20; G06T 2207/10004; G06T 2207/30196; G06T 2207/30241; H04Q 9/00; H04Q 2209/30; H04Q 2209/43; H04Q 2209/94
See application file for complete search history.

(56) References Cited

U.S. PATENT DOCUMENTS

2001/0042245 A1 11/2001 Iwamura
2002/0057383 A1 5/2002 Iwamura
(Continued)

FOREIGN PATENT DOCUMENTS

GB 2483168 A 2/2012
JP 7-146749 A 6/1995

OTHER PUBLICATIONS

International Search Report issued Aug. 6, 2013 in PCT/JP2013/002827.

*Primary Examiner* — Kim Vu
*Assistant Examiner* — Molly Delaney
(74) *Attorney, Agent, or Firm* — Oblon, McClelland, Maier & Neustadt, L.L.P.

(57) ABSTRACT

An information processing system that acquires image data corresponding to a target object that is a target for gesture recognition captured by an imaging device; determines whether a distance between the target object and the imaging device is inadequate for recognition of a gesture made by the target object; and outputs a notification when the determining determines that the distance between the target object and the imaging device is inadequate for recognition of a gesture made by the target object.

18 Claims, 10 Drawing Sheets

(56) References Cited

U.S. PATENT DOCUMENTS

| | | | |
|---|---|---|---|
| 2005/0058337 A1* | 3/2005 | Fujimura | G06K 9/00201 382/159 |
| 2010/0120535 A1 | 5/2010 | Asami | |
| 2010/0269072 A1 | 10/2010 | Sakata et al. | |
| 2011/0185309 A1 | 7/2011 | Challinor et al. | |
| 2012/0056995 A1* | 3/2012 | Dedeoglu | G01S 11/12 348/47 |
| 2012/0200494 A1 | 8/2012 | Perski et al. | |

* cited by examiner

IMAGE PROCESSING APPARATUS AND PROGRAM

TECHNICAL FIELD

The present disclosure relates to an image processing apparatus and a program.

The present disclosure contains subject matter related to that disclosed in Japanese Priority Patent Application JP 2012-121555 filed in the Japan Patent Office on May 29, 2012, the entire content of which is hereby incorporated by reference.

BACKGROUND ART

In recent years, higher functionality or multi-functionality of devices such as electronic devices is progressing more and more, and contents of instructions that have be given to a device for a user to use the device are more diversified and complicated. In many devices, a GUI (Graphical User Interface) is adopted as a user interface, and enables a user to give instructions to the device more easily than when using a device with a CUI (Character User Interface). However, for example, for users who are not familiar with a manipulation using a pointing device such as a mouse, the GUI whose manipulation is performed using the pointing device is not necessarily a user interface with excellent maneuverability.

Further, a technology for executing a process according to a body gesture or a hand gesture of a user has been developed. An example of the technology for executing a process according to a body gesture or a hand gesture of a user may include technology described in PTL 1.

CITATION LIST

Patent Literature

PTL 1: Japanese Patent Application Laid-Open No. 7-146749

SUMMARY

Technical Problem

For example, in the technology described in PTL 1, a process to be executed is switched based on a time until light emitted from a light emitting element is received by a light receiving element or a number of times the light is received. Accordingly, for example, when the technology described in PTL 1 is used, there is a possibility that the process can be executed according to a body gesture or a hand gesture of a user.

However, for example, the technology described in PTL 1 switches a process to be executed based on a time until light emitted from a light emitting element is received by a light receiving element or a number of times the light is received. Accordingly, when the technology described in PTL 1 is used, the body gesture or the hand gesture performed by the user is fed back to the user only as a result of the executed process. Accordingly, when the technology described in PTL 1 is used, the user is highly likely to perform a wrong manipulation, for example, as the number of body gestures or hand gestures that should be performed by the user increases or as the body gesture or the hand gesture that should be performed by the user becomes complex.

In the present disclosure, an image processing apparatus and a program, which are new and improved, capable of feeding back a gesture operation to a user are proposed.

Solution to Problem

An information processing system that acquires image data corresponding to a target object that is a target for gesture recognition captured by an imaging device; determines whether a distance between the target object and the imaging device is inadequate for recognition of a gesture made by the target object; and outputs a notification when the determining determines that the distance between the target object and the imaging device is inadequate for recognition of a gesture made by the target object.

A method performed by information processing system, the method including:

acquiring, by circuitry of the information processing system, image data corresponding to a target object that is a target for gesture recognition captured by an imaging device; determining, by the circuitry, whether a distance between the target object and the imaging device is inadequate for recognition of a gesture made by the target object; and outputting, by the circuitry, a notification when the determining determines that the distance between the target object and the imaging device is inadequate for recognition of a gesture made by the target object.

A non-transitory computer-readable medium including computer-program instruction, which when executed by an information processing system, cause the information processing system to: acquire image data corresponding to a target object that is a target for gesture recognition captured by an imaging device; determine whether a distance between the target object and the imaging device is inadequate for recognition of a gesture made by the target object; and output a notification when the determining determines that the distance between the target object and the imaging device is inadequate for recognition of a gesture made by the target object.

Advantageous Effects of Invention

According to the present disclosure, it is possible to feedback the gesture operation to the user.

DESCRIPTION OF EMBODIMENTS

Figure 1:
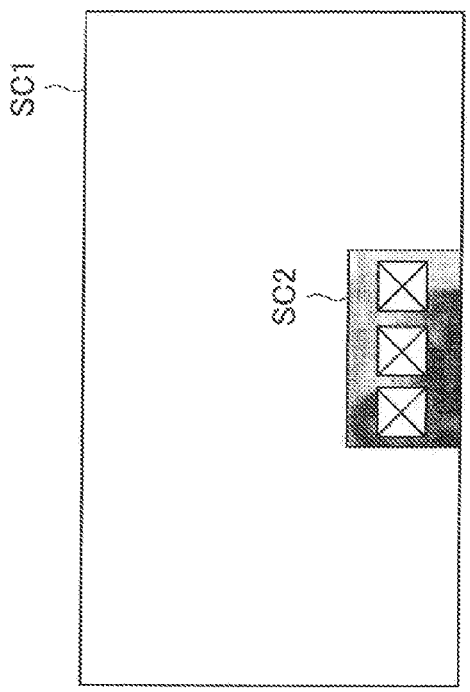
FIG. 1 is an illustrative diagram illustrating image processing in an image processing apparatus according to the present embodiment.
Figure 1:
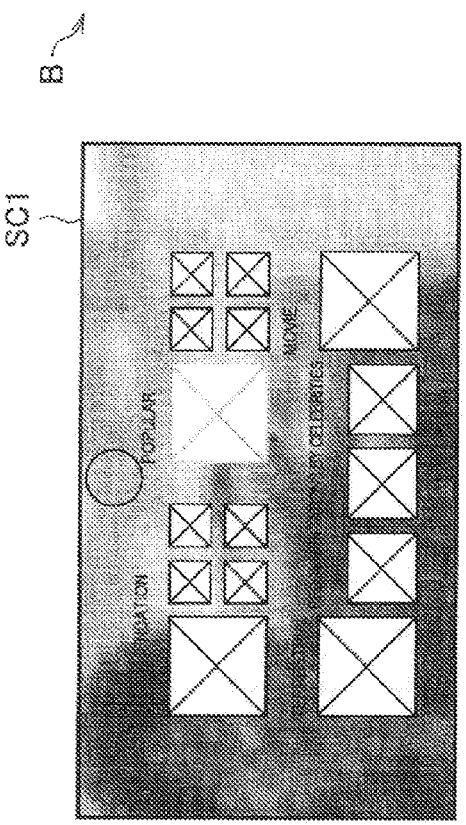

Hereinafter, preferred embodiments of the present disclosure will be described in detail with reference to the appended drawings. Note that, in this specification and the appended drawings, structural elements that have substantially the same function and structure are denoted with the same reference numerals, and repeated explanation of these structural elements is omitted.

Further, a description will be given in the following order:
1. Image processing method according to the present embodiment
2. Image processing apparatus according to the present embodiment
3. Program according to the present embodiment (Image Processing Method According to the Present Embodiment)

An image processing method according to the present embodiment will be described prior to a description of a configuration of the image processing apparatus according to the present embodiment. Further, in the following description, it is assumed that the image processing apparatus according to the present embodiment performs a process according to the image processing method according to the present embodiment.

The image processing apparatus according to the present embodiment combines an image to be displayed in a display region corresponding to an entire display screen or an image to be displayed in a partial region of the display region with a captured image for feeding back a gesture operation to a user (image processing). Also, the image processing apparatus according to the present embodiment displays the combined image on the display screen (a display control process).

Here, the display region according to the present embodiment is a region corresponding to the entire display screen and is a region in which gesture recognition may be performed. Further, the partial region of the display region according to the present embodiment is a region in which the gesture recognition may be performed. An example of the partial region of the display region according to the present embodiment may include a shell screen displayed in a part of the display region. Here, a process related to the gesture recognition may be performed by the image processing apparatus according to the present embodiment or may be performed by an apparatus external to the image processing apparatus according to the present embodiment. Hereinafter, the image processing apparatus according to the present embodiment that performs a process related to gesture recognition and/or an external apparatus that performs a process related to gesture recognition is referred to as "an apparatus that performs a process related to gesture recognition."

Further, an example of the display screen according to the present embodiment may include a display screen of an external display device or a display screen in a display unit (which will be described below) if the image processing apparatus according to the present embodiment includes the display unit (which will be described below). Further, the display screen according to the present embodiment may be a region in which an image is displayed, of a screen, a wall or the like in which an image projected by a projector is displayed.

Further, the captured image according to the present embodiment is, for example, an image obtained by performing mirror image processing (a horizontal inversion process) on an image captured by an external imaging apparatus or by an imaging unit (which will be described below) when the image processing apparatus according to the present embodiment includes the imaging unit. The captured image according to the present embodiment serves to feedback a gesture operation to a user. Here, the mirror image processing may be performed by the image processing apparatus according to the present embodiment or may be performed by the external apparatus such as an imaging apparatus that performs imaging. Further, an example of the captured image according to the present embodiment may include a moving image (or a plurality of still images). Hereinafter, a case in which the captured image according to the present embodiment is a moving image including a plurality of frame images will be described by way of example.

An example of the external imaging apparatus and the imaging unit (which will be described below) according to the present embodiment may include a camera capable of acquiring RGB luminance information, but the external imaging apparatus and the imaging unit (which will be described below) according to the present embodiment are not limited thereto. For example, the external imaging apparatus and the imaging unit (which will be described below) according to the present embodiment can be a special camera capable of acquiring depth information, such as a depth camera.

Further, the captured image according to the present embodiment is not limited to the image subjected to the mirror image processing (horizontal inversion processing). For example, if the mirror image is captured in the imaging apparatus or the imaging unit (which will be described below), the captured image according to the present embodiment may be the captured image itself.

As the image processing apparatus according to the present embodiment performs the process described above, an image with which the captured image has been combined is displayed in the entire display region or the partial region of the display region. As the image with which the captured image has been combined is displayed on the display screen, a user can visually confirm, for example, content of his or her gesture, such as performing a manipulation of sliding his or her hand or pressing using the hand or performing an enlarging manipulation, a reducing manipulation or a moving manipulation using multiple fingers. Accordingly, as the image processing apparatus according to the present embodiment performs the process as described above, the image processing apparatus according to the present embodiment can feedback the gesture operation to the user.

The image processing apparatus according to the present embodiment performs, for example, (1) image processing and (2) a display control process as processes according to the image processing method according to the present embodiment. Hereinafter, the processes according to the image processing method according to the present embodiment will be described in more detail.

(1) Image Processing

The image processing apparatus according to the present embodiment combines the image to be displayed in the display region corresponding to the entire display screen or the image to be displayed in the partial region of the display region with the captured image.

Further, image processing in the image processing apparatus according to the present embodiment is not limited to simple combining of the image to be displayed in the display region corresponding to the entire display screen or the image to be displayed in the partial region of the display region with the captured image.

(1-1) First Example of Image Processing

For example, objects as manipulation targets (hereinafter referred to as "manipulation target objects") manipulated according to a result of gesture recognition, which can be manipulated by the user, such as buttons, icons, menus, and thumbnails indicating pieces of content (e.g., including thumbnails indicating pieces of content that are being reproduced), may be included in the image to be displayed in the display region and the image to be displayed in the partial region of the display region. When the manipulation target object is included in the image to be displayed in the display region with which the captured image is combined or the image to be displayed in the partial region of the display region with which the captured image is been combined, the image processing apparatus according to the present embodiment, for example, is able not to combine the captured image in a region in which the manipulation target object is arranged.

As described above, by not combining the captured image in the region in which the manipulation target object is arranged, the image processing apparatus according to the present embodiment can reduce the possibility of reducing visibility of the manipulation target object by the combining.

(1-2) Second Example of Image Processing

When the image to be displayed in the display region or the image to be displayed in the partial region of the display region and the captured image are simply combined, for example, there is a possibility of reducing visibility of the manipulation target object included in the image to be displayed in the display region or the image to be displayed in the partial region of the display region. Therefore, in order to reduce the possibility of reducing visibility of the manipulation target object, the image processing apparatus according to the present embodiment, for example, can change a degree of visualization of the captured image and combine the captured image whose degree of the visualization has been changed with the image to be displayed in the display region or the image to be displayed in the partial region of the display region.

Here, an example of the change in the degree of visualization of the captured image according to the present embodiment may include a change in a degree of smoothing to smooth the captured image.

In the image processing apparatus according to the present embodiment, for example, as the captured image is smoothed, a painterly effect (e.g., a brush stroke effect) is given to the captured image, as if it were painted by a painter. More specifically, the image processing apparatus according to the present embodiment, for example, calculates a vector direction of an edge in the image (or an angle between the vector and a reference direction such as a horizontal direction and a vertical direction of the image), and adjusts intensity of an edge-preservation smoothing filter based on the vector direction. Also, the image processing apparatus according to the present embodiment smooths the captured image using the adjusted edge-preservation smoothing filter to give the painterly effect to the captured image. Here, an example of the edge-preservation smoothing filter according to the present embodiment may include a smoothing filter capable of preserving the edge, such as a bilateral filter. Further, the process of giving the painterly effect to the captured image in the image processing apparatus according to the present embodiment is not limited thereto. The image processing apparatus according to the present embodiment may use any technology capable of giving the painterly effect to the captured image.

Further, the change in the degree of visualization of the captured image according to the present embodiment is not limited thereto. For example, the image processing apparatus according to the present embodiment may apply a Gaussian filter to the captured image to give a blur effect to the captured image. Further, the image processing apparatus according to the present embodiment may perform, for example, various image processing on the captured image, such as posterization, mosaic, line drawing, or silhouette display, to change the degree of visualization of the captured image.

Further, the image processing apparatus according to the present embodiment, for example, may change, in the captured image, a degree of transparency of the captured image to partially visualize the captured image. More specifically, the image processing apparatus according to the present embodiment, for example, detects a spatial frequency or tint in a background portion of the captured image and dynamically changes the transparency degree according to a detection result. For example, the image processing apparatus according to the present embodiment reduces the transparency degree when the detected spatial frequency is higher (when the image is more complex) or reduces the transparency degree when the detected tint is darker. For example, because the transparency degree is reduced as the detected spatial frequency increases or the transparency degree is reduced as the detected tint becomes dark as described above, the image processing apparatus according to the present embodiment can further prevent a decrease in visibility of the manipulation target object included in the manipulation target image.

Hereinafter, an example of image processing according to the present embodiment will be described using, as a main example, a case in which the image processing apparatus according to the present embodiment combines a captured image whose degree of visualization has been changed with an image to be displayed in a display region or an image to be displayed in a partial region of the display region.

FIG. 1 is an illustrative diagram illustrating image processing in the image processing apparatus according to the present embodiment, and illustrates an example of an image displayed on a display screen by the image processing apparatus according to the present embodiment. Here, A shown in FIG. 1 illustrates an example of an image in which an image to be displayed in a display region and a captured image have been combined in image processing, and B shown in FIG. 1 illustrates one example of an image in which an image to be displayed in a partial region of a display region and the captured image have been combined in the image processing. Further, "SC1" shown in FIG. 1 indicates the display region, and "SC2" shown in FIG. 1 indicates the partial region of the display region.

As illustrated in A of FIG. 1, the image processing apparatus according to the present embodiment combines an image to be displayed in the display region SC1 with the captured image. Also, the image processing apparatus according to the present embodiment displays the combined image on the display screen in process (2) (a display control process), which will be described below. Accordingly, when the image to be displayed in the display region SC1 and the captured image are combined as illustrated in A of FIG. 1, the image processing apparatus according to the present embodiment can feedback a gesture operation to the user using the entire display screen.

Further, as illustrated in B of FIG. 1, the image processing apparatus according to the present embodiment combines the image to be displayed in the partial region SC2 of the display region with the captured image. Also, the image processing apparatus according to the present embodiment displays the combined image on the display screen in process (2) (the display control process), which will be described below. Accordingly, when the image to be displayed in the partial region SC2 of the display region and the captured image are combined as illustrated in B of FIG. 1, the image processing apparatus according to the present embodiment can feedback the gesture operation to the user using a part of the display screen. Here, a size or position of the partial region SC2 of the display region is, for example, set in advance, but the partial region SC2 of the display region according to the present embodiment is not limited to thereto. For example, the size or the position of the partial region SC2 of the display region according to the present embodiment can be freely set by the user or the like.

Hereinafter, an example of the image to be displayed on the display screen in each of a case in which the image to be displayed in the display region and the captured image are combined in image processing according to the present embodiment and a case in which the image to be displayed in the partial region of the display region and the captured image are combined in image processing according to the present embodiment will be described.

Figure 2:
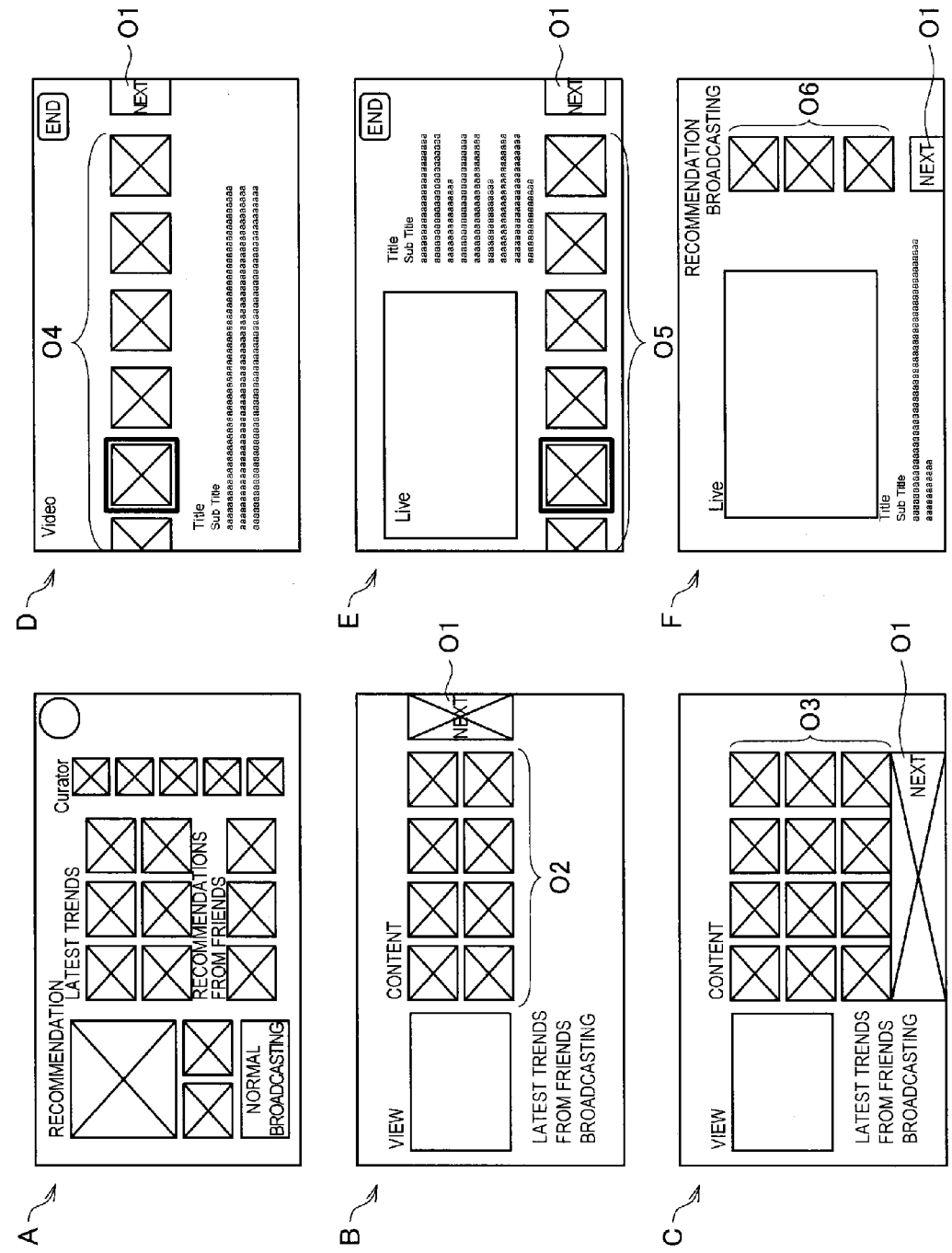
FIG. 2 is an illustrative diagram illustrating the image processing in the image processing apparatus according to the present embodiment.

(I) When the Image to be Displayed in the Display Region and the Captured Image are Combined FIG. 2 is an illustrative diagram illustrating image processing in the image processing apparatus according to the present embodiment. Here, FIG. 2 illustrates an example of an image to be displayed on the display screen through the display control process according to the present embodiment when the image to be displayed in the display region and the captured image are combined in the image processing according to the present embodiment. Further, in FIG. 2, only one example of an image to be displayed in the display region before the captured image is combined, rather than an image combined by the image processing according to the present embodiment, is illustrated for convenience of description.

As illustrated in FIG. 2, manipulation target objects that can be manipulated by the user, such as buttons, icons, menus, or thumbnails indicating pieces of content, may be included in the image to be displayed in the display region. Further, as illustrated in A to F of FIG. 2, the manipulation target objects may be arranged in several positions in the display region. Here, the manipulation target objects within the display region, for example, may be freely arranged in the display region, as illustrated in A to C of FIG. 2 or may be arranged with emphasis in a particular direction, like an arrangement with emphasis in a horizontal direction as illustrated in D and E of FIG. 2 or an arrangement with emphasis in a vertical direction as illustrated in F of FIG. 2.

Further, for example, a manipulation target object for sliding and displaying (i.e., scrolling) some manipulation target objects in the image to be displayed on the display screen in a horizontal direction or a vertical direction, such as a manipulation target object O1 shown in B to F of FIG. 2, may be included in the image to be displayed in the display region.

For example, when an image illustrated in A of FIG. 2 (more strictly, an image in which the image illustrated in A of FIG. 2 and the captured image have been combined; the same applies hereinafter) has been displayed on the display screen, if a user (a manipulator) performs a gesture of striking (touching) a desired manipulation target object by hand (an example of the gesture) or a gesture of maintaining contact with the desired manipulation target object for a predetermined set time (an example of the gesture) on the desired manipulation target object, the apparatus that performs a process related to gesture recognition recognizes that an execution manipulation causing the apparatus that performs a process related to gesture recognition to execute a process corresponding to the manipulation target object has been performed. Here, in the above example, the user's hand is an object of a target to be subjected to gesture recognition (hereinafter referred to as a "recognition target object"). Also, when the execution manipulation is recognized to have been performed, the apparatus that performs a process related to gesture recognition performs, for example, a process associated with the manipulation target object of the target on which the execution manipulation has been performed. Here, an example of the process associated with the manipulation target object may include a reproduction process of reproducing corresponding content data, a process of executing an associated application, or a process of screen-transitioning to another manipulation screen. Further, it is understood that the gesture manipulation recognized by the apparatus that performs a process related to gesture recognition according to the present embodiment is not limited to the gesture of striking the manipulation target object by hand or the gesture of maintaining contact with a desired manipulation target object for a predetermined set time, and that the process performed according to the gesture manipulation recognized by the apparatus that performs a process related to gesture recognition is not limited to the example shown above.

Further, even when the images illustrated in B to F of FIG. 2 (more strictly, images in which the images illustrated in B to F of FIG. 2 and the captured image have been combined; the same applies hereinafter) have been displayed on the display screen, the apparatus that performs a process related to gesture recognition recognizes an execution manipulation, as in the case in which the image illustrated in A of FIG. 2 has been displayed on the display screen. Also, the apparatus that performs a process related to gesture recognition performs a process associated with a manipulation target object of a target on which the execution manipulation has been performed.

For example, if the execution manipulation is recognized to have been performed on the manipulation target object O1 shown in B to F of FIG. 2, the apparatus that performs a process related to gesture recognition performs a scrolling process to scroll some manipulation target objects. More specifically, for example, if the execution manipulation is recognized to have been performed on the manipulation target object O1 shown in B and C of FIG. 2, the apparatus that performs a process related to gesture recognition does not scroll manipulation target objects O2 shown in B of FIG. 2 and manipulation target objects O3 shown in C of FIG. 2 since there are no manipulation target objects that can be displayed other than the manipulation target objects O2 and the manipulation target objects O3. Further, for example, if the execution manipulation is recognized to have been performed on the manipulation target object O1 shown in D and E of FIG. 2, the apparatus that performs a process related to gesture recognition scrolls manipulation target objects O4 shown in D of FIG. 2 and manipulation target objects O5 shown in E of FIG. 2 in a horizontal direction (e.g., to the right on the display screen). Further, for example, if the execution manipulation is recognized to have been performed on the manipulation target object O1 as illustrated in F of FIG. 2, the apparatus that performs a process related to gesture recognition scrolls manipulation target objects O6 shown in F of FIG. 2 in a vertical direction (e.g., downward on the display screen).

Figure 3:
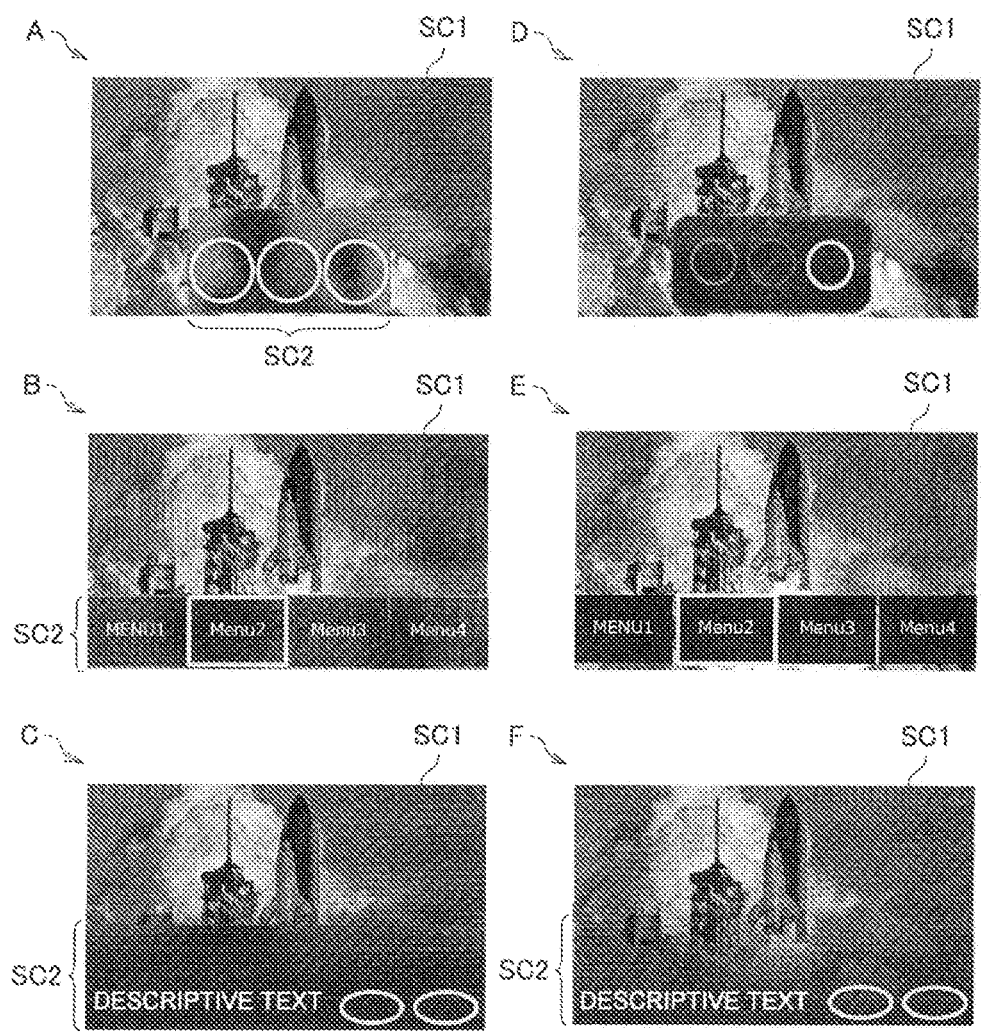
FIG. 3 is an illustrative diagram illustrating the image processing in the image processing apparatus according to the present embodiment.

(II) When the Image to be Displayed in the Partial Region of the Display Region and the Captured Image are Combined FIG. 3 is an illustrative diagram illustrating the image processing in the image processing apparatus according to the present embodiment. Here, FIG. 3 illustrates an example of the image to be displayed on the display screen through the display control process according to the present embodiment when the image to be displayed in the partial region of the display region and the captured image are combined in the image processing according to the present embodiment. For example, A and D shown in FIG. 3 illustrate examples in which an image showing a shell screen is displayed on the display screen as the image to be displayed in the partial region of the display region. Further, for example, B and E shown in FIG. 3 illustrate examples in which an image showing a title of content is displayed on the display screen as the image to be displayed in the partial region of the display region (an example of the title display). Further, for example, C and F shown in FIG. 3 illustrate examples in which the manipulation target objects are included in the partial region of the display region, and the partial region of the display region is gradation-displayed (an example of gradient display). Further, in FIG. 3, an example of the image to be displayed in a part of the display screen when the content data is being reproduced is shown. Further, "SC1" shown in FIG. 3 indicates the display region, and "SC2" shown in FIG. 3 indicates the partial region of the display region.

As illustrated in the partial region SC2 of the display region shown in A to C of FIG. 3, an image in which the image to be displayed in the partial region of the display region and the captured image have been combined is displayed on the display screen through the image processing and the display control process in the image processing apparatus according to the present embodiment. As described above, for example, manipulation target objects that can be manipulated by the user, such as buttons, icons, menus, or thumbnails indicating pieces of content, may be included in the image to be displayed in the partial region of the display region. Accordingly, the apparatus that performs a process related to gesture recognition, for example, can recognize the gesture manipulation made by the user and perform a process corresponding to the recognized gesture manipulation, as in the case in which the image to be displayed in the display region and the captured image are combined.

For example, when the image illustrated in A of FIG. 3 has been displayed on the display screen, a user (manipulator) performs a gesture of striking (touching) the desired manipulation target object (an example of a gesture) by hand on the manipulation target object, the apparatus that performs a process related to gesture recognition recognizes that an execution manipulation causing the apparatus that performs a process related to gesture recognition to execute, for example, a process corresponding to the manipulation target object recognition has been performed. Also, if it is recognized that the execution manipulation has been performed, the apparatus that performs a process related to gesture recognition performs, for example, a process associated with a manipulation target object of the target on which the execution manipulation has been performed.

Further, even when the images illustrated in B and C of FIG. 3 are displayed on the display screen, the apparatus that performs a process related to gesture recognition recognizes the execution manipulation, as in the case in which the image illustrated in A of FIG. 3 is displayed on the display screen. Also, the apparatus that performs a process related to gesture recognition performs, for example, a process associated with a manipulation target object of the target on which the execution manipulation has been performed. For example, when the image illustrated in B of FIG. 3 has been displayed on the display screen, the apparatus that performs a process related to gesture recognition performs a reproduction process to reproduce content data associated with the manipulation target object of the target on which the execution manipulation has been performed. By performing the reproduction process to reproduce content data associated with the manipulation target object of the target on which the execution manipulation has been performed, content indicated by content data associated with the manipulation target object of the target on which the execution manipulation has been performed is displayed on the display screen.

For example, as illustrated in A to C of FIG. 3, the image processing apparatus according to the present embodiment combines the image to be displayed in the partial region of the display region and the captured image in the image processing according to the present embodiment, and displays the combined image on the display screen in the process (2) (the display control process), which will be described below.

Further, the image displayed on the display screen by the image processing apparatus according to the present embodiment is not limited to the image in which the image to be displayed in the partial region of the display region and the captured image have been combined. For example, the image processing apparatus according to the present embodiment may display the image to be displayed in the partial region of the display region without combining the image to be displayed in the partial region of the display region with the captured image, as illustrated in D to F of FIG. 3. For example, when the image to be displayed in the partial region of the display region is displayed on the display screen as illustrated in D to F of FIG. 3, the user (manipulator) performs, for example, a manipulation using a pointing device such as a mouse, a manipulation device such as a button, or an external manipulation device such as a remote controller. Also, an apparatus that executes a process (e.g., the image processing apparatus according to the present embodiment and/or an external apparatus) performs a process corresponding to a user manipulation based on a manipulation signal according to a user manipulation delivered from various devices as described above.

For example, as illustrated in FIGS. 2 and 3, the image processing apparatus according to the present embodiment combines the image to be displayed in the display region or the image to be displayed in the partial region of the display region with the captured image, and displays the combined image on the display screen image. Thus, the image processing apparatus according to the present embodiment can feedback a gesture operation to the user using the entire display screen or the part of the display screen.

Further, the image displayed on the display screen by the image processing and the display control process according to the present embodiment is not limited to the examples shown in FIGS. 2 and 3.

Figure 4:
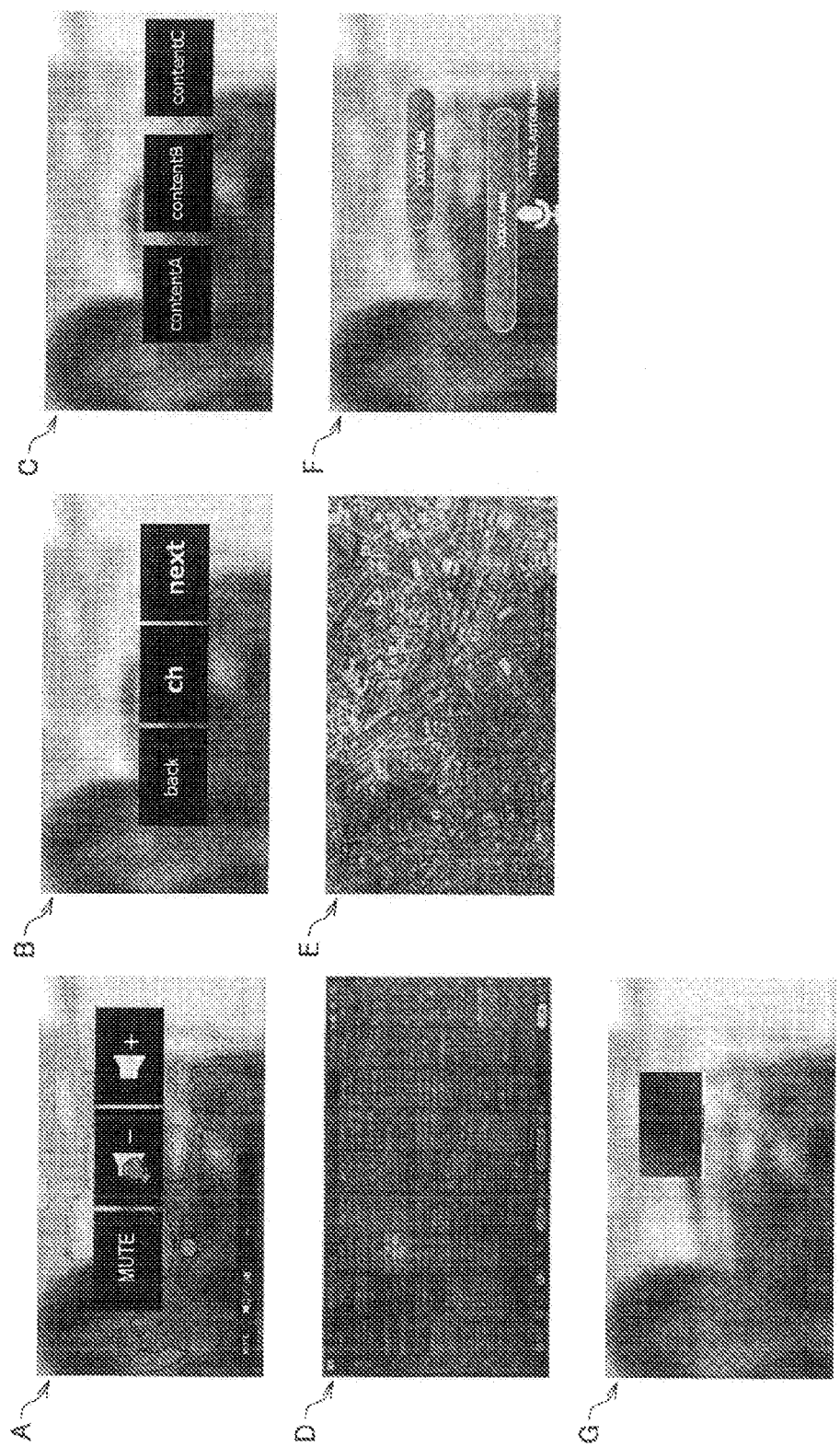
FIG. 4 is an illustrative diagram illustrating the image processing in the image processing apparatus according to the present embodiment.

FIG. 4 is an illustrative diagram illustrating the image processing in the image processing apparatus according to the present embodiment. Here, FIG. 4 illustrates an example of an image displayed on the display screen when the image processing apparatus according to the present embodiment has combined the image to be displayed in the display region with the captured image in the image processing according to the present embodiment. The example of the image illustrated in FIG. 4 may be applied to the case in which the image to be displayed in the partial region of the display region and the captured image are combined in the image processing according to the present embodiment.

For example, A of FIG. 4 illustrates an example of an image in which an image for changing a volume (an example of the image to be displayed in the display region) and the captured image have been combined. For example, when the image illustrated in A of FIG. 4 has been displayed on the display screen, the user (manipulator) moves a finger (an example of the recognition target object on which gesture recognition is performed) on the desired manipulation target object, the apparatus that performs a process related to gesture recognition detects the user's finger that is the recognition target object. Also, the apparatus that performs a process related to gesture recognition moves a pointer indicating a location on the display screen in which a gesture is recognized, to a position of the detected finger.

When the image illustrated in A of FIG. 4 has been displayed on the display screen, if the user (manipulator) performs a gesture of striking (touch) the desired manipulation target object (an example of the gesture) by hand on the manipulation target object, the apparatus that performs a process related to gesture recognition recognizes that an execution manipulation causing the apparatus that performs a process related to gesture recognition to execute, for example, a process corresponding to the manipulation target object has been performed. Also, if it is recognized that the execution manipulation has been performed, the apparatus that performs a process related to gesture recognition performs, for example, a process associated with the manipulation target object of the target on which the execution manipulation has been performed.

Thus, when the image illustrated in A of FIG. 4 has been displayed on the display screen, the apparatus that performs a process related to gesture recognition performs the process associated with the manipulation target object of the target on which the execution manipulation has been performed. Accordingly, the user can cause, through the gesture manipulation, the apparatus that performs a process related to gesture recognition to perform, for example, a process related to mute, or increase or decrease in volume.

Further, for example, B of FIG. 4 illustrates an example of an image in which an image for changing a channel on television broadcasting (an example of the image to be displayed in the display region) and the captured image have been combined. For example, even when the image illustrated in B in FIG. 4 has been displayed on the display screen, the apparatus that performs a process related to gesture recognition recognizes, for example, an execution manipulation, and performs a process associated with a manipulation target object of the target on which the execution manipulation has been performed, as in the case in which the image illustrated in A of FIG. 4 has been displayed on the display screen. For example, if it is recognized that an execution manipulation for a manipulation target object corresponding to "back" shown in B of FIG. 4 has been performed, the apparatus that performs a process related to gesture recognition changes a channel to a channel immediately before a current channel. Further, for example, if it is recognized that the execution manipulation has been performed on a manipulation target object corresponding to "next" shown in B of FIG. 4, the apparatus that performs a process related to gesture recognition changes the channel to a channel immediately after the current channel.

Thus, when the image illustrated in B of FIG. 4 has been displayed on the display screen, the apparatus that performs a process related to gesture recognition performs a process associated with a manipulation target object of the target on which the execution manipulation has been performed. Accordingly, the user can cause, through the gesture manipulation, the apparatus that performs a process related to gesture recognition to perform a process related to the channel change.

Further, for example, C of FIG. 4 illustrates an example of an image in which an image for selecting content data to be reproduced (an example of the image to be displayed in the display region) and the captured image have been combined. For example, even when the image illustrated in C of FIG. 4 has been displayed on the display screen, the apparatus that performs a process related to gesture recognition recognizes, for example, the execution manipulation and performs a process associated with a manipulation target object of the target on which the execution manipulation has been performed, as in the case in which the image illustrated in A of FIG. 4 has been displayed on the display screen. For example, if it is recognized that the execution manipulation has been performed on a manipulation target object corresponding to one of the "content A," "content B," and "content C" illustrated in C of FIG. 4, the apparatus that performs a process related to gesture recognition reproduces content data associated with the manipulation target object on which the execution manipulation is recognized to have been performed.

Thus, when the image illustrated in C of FIG. 4 has been displayed on the display screen, the apparatus that performs a process related to gesture recognition performs a process associated with a manipulation target object of the target on which the execution manipulation has been performed. Accordingly, the user can cause, through the gesture manipulation, the apparatus that performs a process related to gesture recognition to perform, for example, a reproduction process of generating content data indicating desired content.

Further, for example, D of FIG. 4 illustrates an example of an image in which an image showing an EPG (Electronic Program Guide) (one example of the image to be displayed in the display region) and the captured image have been combined. For example, even when the image illustrated in D of FIG. 4 has been displayed on the display screen, the apparatus that performs a process related to gesture recognition recognizes, for example, the execution manipulation and performs a process associated with a manipulation target object of the target on which the execution manipulation has been performed, as in the case in which the image illustrated in A of FIG. 4 has been displayed on the display screen. For example, if it is recognized that the execution manipulation has been performed for the manipulation target object corresponding to one of programs indicated by the EPG, the apparatus that performs a process related to gesture recognition performs a process of, for example, performing recording reservation of a program corresponding to the manipulation target object on which the execution manipulation is recognized to have been performed, or searching and displaying information of the program.

Thus, when the image illustrated in C of FIG. 4 has been displayed on the display screen, the apparatus that performs a process related to gesture recognition performs a process associated with a manipulation target object of the target on which the execution manipulation has been performed. Accordingly, the user can cause, through the gesture manipulation, the apparatus that performs a process related to gesture recognition to perform, for example, a process for a desired program.

Further, for example, E of FIG. 4 illustrates an example of an image in which an image showing a map (an example of an image to be displayed in the display region) and the captured image have been combined. For example, even when the image illustrated in E of FIG. 4 has been displayed on the display screen, the apparatus that performs a process related to gesture recognition recognizes, for example, the execution manipulation, and performs a process associated with a manipulation target object of the target on which the execution manipulation has been performed, as in the case in which the image illustrated in A of FIG. 4 has been displayed on the display screen. For example, if it is recognized that the execution manipulation has been performed for one point on the map (corresponding to the manipulation target object), the apparatus that performs a process related to gesture recognition performs a process of, for example, enlarging and displaying a point on which the execution manipulation is recognized to have been performed or searching and displaying information of the point.

Thus, when the image illustrated in D of FIG. 4 has been displayed on the display screen, the apparatus that performs a process related to gesture recognition performs a process associated with a manipulation target object of the target on which the execution manipulation has been performed. Accordingly, the user can cause, through the gesture manipulation, the apparatus that performs a process related to gesture recognition to perform, for example, a process for the desired point.

Further, for example, F of FIG. 4 illustrates an example of an image in which an image showing an output result to a sound input (one example of an image to be displayed in the display region) and the captured image have been combined. For example, even when the image illustrated in F of FIG. 4 has been displayed on the display screen, the apparatus that performs a process related to gesture recognition recognizes, for example, the execution manipulation, and performs a process associated with a manipulation target object of the target on which the execution manipulation has been performed, as in the case in which the image illustrated in A of FIG. 4 has been displayed on the display screen. For example, if it is recognized that the execution manipulation has been performed on a manipulation target object showing the output result to the sound input, the apparatus that performs a process related to gesture recognition performs a process of, for example, an application and data corresponding to the manipulation target object on which the execution manipulation has been recognized to have been performed.

Thus, when the image illustrated in F of FIG. 4 has been displayed on the display screen, the apparatus that performs a process related to gesture recognition performs a process associated with a manipulation target object of the target on which the execution manipulation has performed. Accordingly, the user can cause, through the gesture manipulation, the apparatus that performs a process related to gesture recognition to perform, for example, a process for the output result to the sound input.

Further, for example, G of FIG. 4 illustrates an example of an image in which an image showing an output result of AR (Augmented Reality) (an example of an image to be displayed in the display region) and the captured image have been combined. For example, even when the image illustrated in G of FIG. 4 has been displayed on the display screen, the apparatus that performs a process related to gesture recognition recognizes, for example, the execution manipulation and performs a process associated with a manipulation target object of the target on which the execution manipulation has been performed, as in the case in which the image illustrated in A of FIG. 4 has been displayed on the display screen. For example, if it is recognized that the execution manipulation has been performed on the manipulation target object showing the output result of the AR, the apparatus that performs a process related to gesture recognition performs a process of, for example, executing an application and data corresponding to the manipulation target object on which the execution manipulation is recognized to have been performed.

For example, as illustrated in FIGS. 2 to 4, the image processing apparatus according to the present embodiment displays a variety of images on the display screen through the image processing and the display control process according to the present embodiment. It is understood that the image displayed on the display screen by the image processing apparatus according to the present embodiment is not limited to the examples shown in FIGS. 2 to 4.

As described above, the image processing apparatus according to the present embodiment performs the process of combining the image to be displayed in the display region corresponding to the entire display screen or the image to be displayed in the partial region of the display region with the captured image, as the image processing according to the present embodiment. Further, the image processing in the image processing apparatus according to the present embodiment is not limited to the processing described above.

(1-3) Third Example of Image Processing

For example, the image processing apparatus according to the present embodiment may detect the recognition target object to be subjected to gesture recognition from the captured image, and may arrange the manipulation target object in the image to be displayed in the display region with which the captured image is combined or the image to be displayed in the partial region of the display region with which the captured image is combined based on a position of the detected recognition target object.

Figure 5:
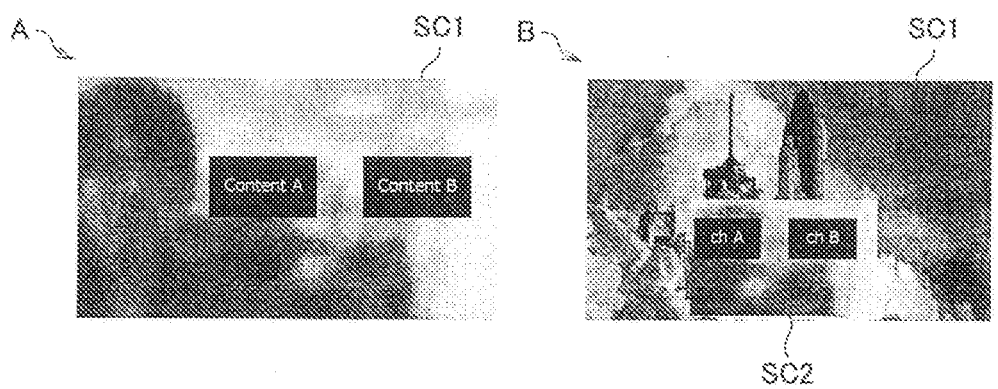
FIG. 5 is an illustrative diagram illustrating the image processing in the image processing apparatus according to the present embodiment.

FIG. 5 is an illustrative diagram illustrating the image processing in the image processing apparatus according to the present embodiment. Here, A shown in FIG. 5 illustrates an example of an image displayed on the display screen when the image processing apparatus according to the present embodiment has combined the image to be displayed in the display region with the captured image in the image processing according to the present embodiment. Further, B shown in FIG. 5 illustrates an example of an image displayed on the display screen when the image processing apparatus according to the present embodiment has combined the image to be displayed in the partial region of the display region with the captured image in the image processing according to the present embodiment. Further, "SC1" shown in FIG. 5 indicates the display region, and "SC2" shown in FIG. 5 indicates the partial region of the display region.

Further, FIG. 5 illustrates an example of an image displayed when the image processing apparatus according to the present embodiment detects a finger of the user as the recognition target object. Further, the recognition target object according to the present embodiment is not limited to the finger of the user and, for example, may be a specific object such as a hand of the user or a specific device.

The image processing apparatus according to the present embodiment detects the finger of the user (an example of the recognition target object) from the captured image. Here, the image processing apparatus according to the present embodiment detects the finger of the user from the captured image, for example, by detecting an edge from the captured image and performing template matching process based on an edge image indicating the detected edge and a template image. Further, the image processing apparatus according to the present embodiment may detect the finger of the user from the captured image using any finger detection technology.

If the finger of the user is detected from the captured image, the image processing apparatus according to the present embodiment determines an arrangement position of the manipulation target object in the image to be displayed in the display region with which the captured image is to be combined, or the image to be displayed in the partial region of the display region with which the captured image is to be combined based on the position of the detected finger in the captured image (e.g., indicated by a coordinate; the same applies hereinafter). The image processing apparatus according to the present embodiment, for example, determines a position a predetermined distance away from the position of the detected finger as the arrangement position of the manipulation target object. The predetermined distance may be, for example, a fixed value set in advance or a variable value that can be changed based on a user manipulation. Further, the image processing apparatus according to the present embodiment may determine the arrangement position of the manipulation target object based on set priority. A setting example of the priority may include setting high priority for a position a predetermined distance away in a horizontal direction from the position of the detected finger and setting low priority for a position a predetermined distance away in a vertical direction from the position of the detected finger.

If an arrangement position of the manipulation target object in the image to be displayed in the display region with which the captured image is to be combined or the image to be displayed in the partial region of the display region with which the captured image is to be combined is determined, the image processing apparatus according to the present embodiment arranges, for example, the manipulation target object in the image to be displayed in the display region or the image to be displayed in the partial region of the display region. Further, the image processing apparatus according to the present embodiment combines the image to be displayed in the display region or the image to be displayed in the partial region of the display region with the captured image. Also, the image processing apparatus according to the present embodiment displays the combined image on the display screen in the process (2) (the display control process), which will be described below.

For example, by performing the process as described above, the image processing apparatus according to the present embodiment can display an image in which the manipulation target object is displayed near the finger of the user (an example of the recognition target object), on the display screen, for example, as illustrated in A and B of FIG. 5.

(1-4) Fourth Example of Image Processing

Further, the image processing apparatus according to the present embodiment, for example, can detect the recognition target object to be subjected to gesture recognition from the captured image, and newly arrange the manipulation target object in the image to be displayed to in the display region or the image to be displayed in the partial region of the display region based on the motion of the detected recognition target object.

Figure 6:
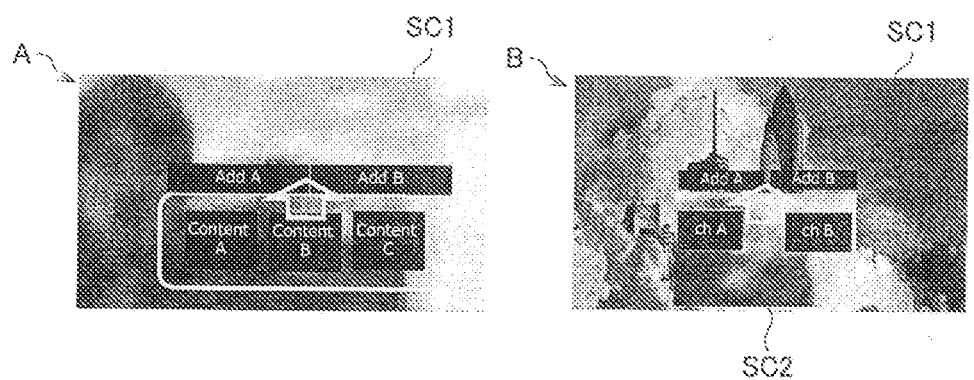
FIG. 6 is an illustrative diagram illustrating the image processing in the image processing apparatus according to the present embodiment.

FIG. 6 is an illustrative diagram illustrating the image processing in the image processing apparatus according to the present embodiment. Here, A shown in FIG. 6 illustrates an example of an image displayed on the display screen when the image processing apparatus according to the present embodiment has combined the image to be displayed in the display region with the captured image in the image processing according to the present embodiment. Further, B shown in FIG. 6 illustrates an example of an image displayed on the display screen when the image processing apparatus according to the present embodiment has combined the image to be displayed in the partial region of the display region with the captured image in the image processing according to the present embodiment. Further, "SC1" shown in FIG. 6 indicates the display region, and "SC2" shown in FIG. 6 indicates the partial region of the display region.

Further, FIG. 6 illustrates an example of an image displayed when the image processing apparatus according to the present embodiment detects the finger of the user as the recognition target object, as in the example shown in FIG. 5. Further, the recognition target object according to the present embodiment is not limited to the finger of the user, and may be, for example, a specific object, such as a hand of the user or a specific device, as described above. Further, an upward arrow shown in FIG. 6 indicates, for convenience, an example of the motion of the finger of the user (an example of the recognition target object).

The image processing apparatus according to the present embodiment detects the finger of the user (an example of the recognition target object) from the captured image. Here, the image processing apparatus according to the present embodiment repeats the process related to the detection of the finger of the user regularly/irregularly.

Further, the image processing apparatus according to the present embodiment detects the motion of the finger of the user (an example of the recognition target object) based on a position of the previously detected finger and a position of the currently detected finger. Also, if the detected motion is a predetermined motion, the image processing apparatus according to the present embodiment newly arranges the manipulation target object in the image to be displayed in the display region or the image to be displayed in the partial region of the display region.

For example, if the finger of the user moving upward is detected as the motion of the finger of the user, "Add A" and "Add B," which are new manipulation target objects, are newly arranged, as illustrated in A and B of FIG. 6.

For example, by performing the process as described above, the image processing apparatus according to the present embodiment can display an image in which the manipulation target object is to be newly arranged on the display screen based on the motion of the finger of the user (an example of the recognition target object), for example, as illustrated in A and B of FIG. 6. Further, while the example of the process when the finger of the user (an example of the recognition target object) moving upward is detected has been shown above, the motion detected by the image processing apparatus according to the present embodiment is not limited to the above. For example, when the image processing apparatus according to the present embodiment detects that the finger of the user moves downward or horizontally, the apparatus can newly arrange the manipulation target object based on the motion. Here, the position in which the image processing apparatus according to the present embodiment arranges the new manipulation target object may be a position corresponding to a direction of the detected motion or a position corresponding to a direction set in advance.

(2) Display Control Process

The image processing apparatus according to the present embodiment displays the combined image on the display screen in the process (1) (image processing).

Here, when the image processing apparatus according to the present embodiment displays the image on a display screen of an external display device, the image processing apparatus according to the present embodiment transmits, for example, an image signal indicating the image to the display device to display the image on the display device. Further, when the image processing apparatus according to the present embodiment displays the image on a display screen of a display unit (which will be described below), the image processing apparatus according to the present embodiment delivers an image signal indicating the image to the display unit (which will be described below) to display the image.

The image processing apparatus according to the present embodiment performs, for example, the process (1) (image processing) and the process (2) (display control process) as the processes according to the image processing method according to the present embodiment. The image processing apparatus according to the present embodiment combines the image to be displayed in the display region corresponding to the entire display screen or the image to be displayed in the partial region of the display region with the captured image in the process (1) (image processing). Also, the combined image is displayed on the display screen through the process (2) (display control process).

Here, if the image processing apparatus according to the present embodiment combines the image to be displayed in the display region corresponding to the entire display screen with the captured image in the process (1) (image processing), the image processing apparatus according to the present embodiment can feedback a gesture operation to the user using the entire display screen. Further, if the image processing apparatus according to the present embodiment combines the image to be displayed in the partial region of the display region with the captured image in the process (1) (image processing), the image processing apparatus according to the present embodiment can feedback the gesture operation to the user using a portion of the display screen.

Thus, the image processing apparatus according to the present embodiment can feedback the gesture operation to the user.

Further, the process according to the image processing method according to the present embodiment in the image processing apparatus according to the present embodiment is not limited to the process (1) (image processing) and the process (2) (display control process).

For example, if the user performs a gesture operation, when a distance between the imaging device (imaging apparatus) that has captured the captured image and the recognition target object, such as the hand of the user, to be subjected to gesture recognition is short, the gesture manipulation may not be recognized in the device that performs a process related to gesture recognition. This occurs, for example, when it is difficult for the recognition target object to be detected correctly, such as when it is difficult for a shape of the hand of the user to be fully detected from the captured image.

Here, as a method of preventing a situation in which it is difficult for the gesture manipulation to be recognized as described above, for example, "a method of determining whether the distance is a short distance using a device capable of measuring a distance, such as an infrared sensor or a laser and notifying the user of the distance being a short distance if the distance is determined to be a short distance," or "a method of determining whether the distance is a short distance based on a change in a luminance value of the captured image and notifying the user of the distance being a short distance if the distance is determined to be a short distance" may be considered. While the disclosure that follows relates to determining whether the distance is too short to recognize the gesture manipulation, the disclosure is by no means limited thereto. For example, the same features disclosed below to determine whether a distance is too short to recognize a gesture manipulation can be similarly applied to determine whether a distance is too long to recognize a gesture manipulation.

However, in the method of determining whether the distance is a short distance using the device capable of measuring a distance, such as an infrared sensor, such a device is necessary. This method may not be applied to an apparatus that does not include such a device. Since the method of determining whether the distance is a short distance based on a change in a luminance value of the captured image includes determining whether the distance is a short distance based on the change in the luminance value of the captured image, a wrong determination may be made in some imaging conditions in the imaging device.

Therefore, the image processing apparatus according to the present embodiment determines whether a distance between an object with motion included in the captured image and the imaging apparatus that has captured the captured image is a short distance based on the captured image (a short distance determination process).

More specifically, the image processing apparatus according to the present embodiment determines whether the distance between the object and the imaging apparatus is a short distance based on motion information indicating the motion of the object calculated based on the captured image. The image processing apparatus according to the present embodiment, for example, calculates an area of a region corresponding to a specific motion direction in the captured image based on the motion information, and determines whether the distance between the object and the imaging apparatus is a short distance through threshold processing based on the calculated area and a predetermined threshold.

Here, an example of the motion information according to the present embodiment may include a motion vector (optical flow) calculated from the captured image. The image processing apparatus according to the present embodiment, for example, calculates the motion vector using the luminance information in the captured image. If an image size of the captured image is VGA or QVGA, the image processing apparatus according to the present embodiment calculates the motion vector, for example, in units of 32×32 blocks or in units of a greater size. Further, a block size in which the image processing apparatus according to the present embodiment calculates the motion vector is not limited thereto, and the image processing apparatus according to the present embodiment may calculate the motion vector, for example, for each pixel or in units of 4×4 blocks. Further, the image processing apparatus according to the present embodiment may change the block size to calculate the motion vector, for example, according to a recognition target object to be subjected to the gesture recognition or a gesture operation to be subjected to the gesture recognition.

Further, the process related to the calculation of the motion vector in the image processing apparatus according to the present embodiment is not limited to the above process. For example, the image processing apparatus according to the present embodiment can calculate the motion vector using color information indicating a specific color (e.g., a skin color or green) in the captured image. Further, when the captured image is a moving image including a plurality of frame images, the image processing apparatus according to the present embodiment, for example, takes a difference between frame images continuous in a time series to calculate the motion vector.

Further, a method of calculating the motion vector in the image processing apparatus according to the present embodiment is not limited to the above method. For example, the image processing apparatus according to the present embodiment may calculate the motion vector using any method capable of calculating the motion vector based on the captured image. Further, the image processing apparatus according to the present embodiment may, for example, detect the recognition target object to be subjected to the gesture recognition, such as the hand of the user, from the captured image, and limit a region of a target whose motion vector is calculated in the captured image based on the detected position of the recognition target object or a region in which the recognition target object is detected (e.g., a region indicating a skin color if the recognition target object is a hand). By limiting the region of the target whose motion vector is calculated, the image processing apparatus according to the present embodiment can reduce a processing amount related to the calculation of the motion vector.

If the short distance determination process is performed, the image processing apparatus according to the present embodiment selectively notifies the user of the distance determination result based on the distance determination result in the short distance determination process (the notification process). More specifically, the image processing apparatus according to the present embodiment notifies the user of the distance determination result when the distance is determined to be a short distance in the short distance determination process. Further, for example, if the distance is not determined to be a short distance in the short distance determination process, the image processing apparatus according to the present embodiment does not notify the user of the distance determination result.

Figure 7:
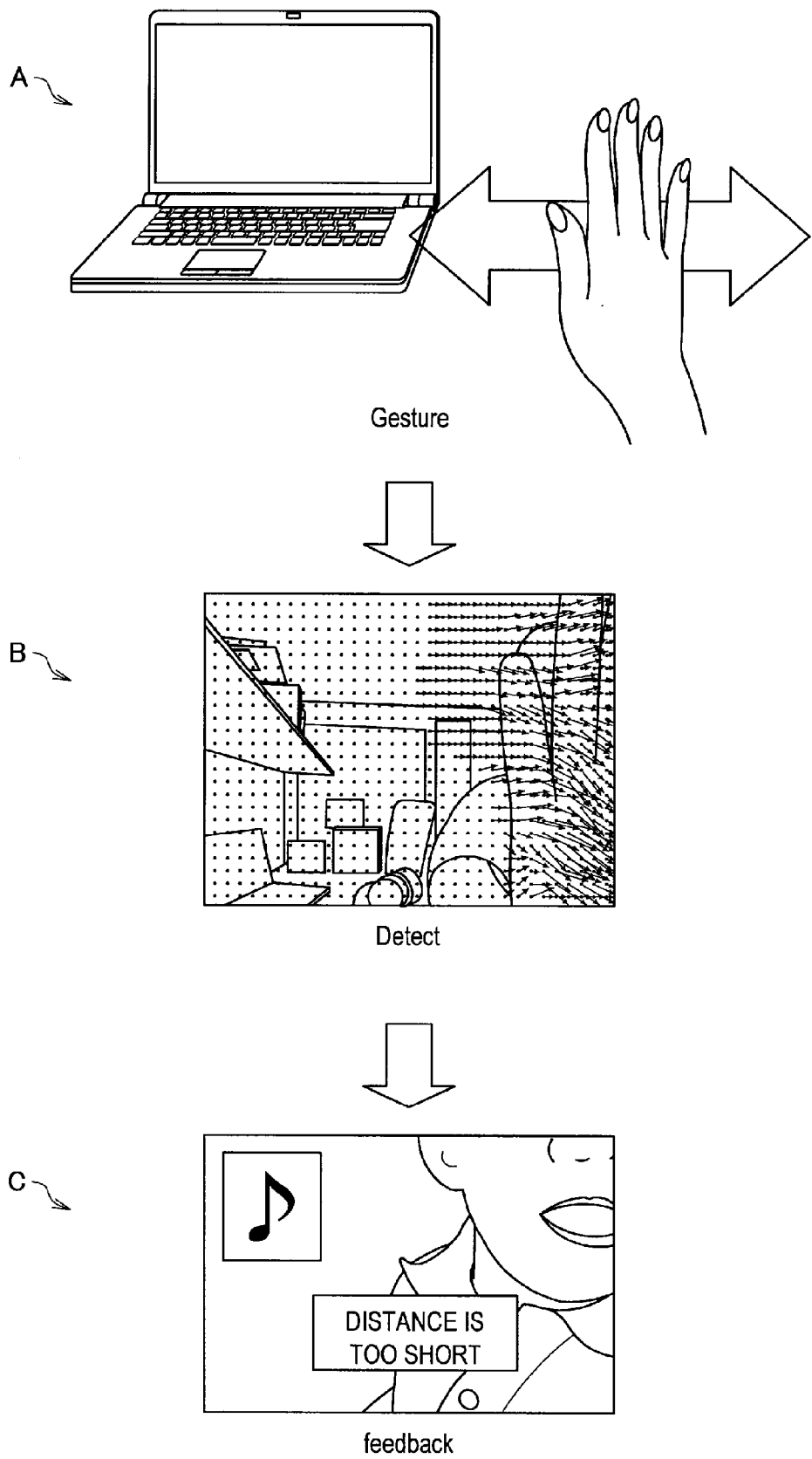
FIG. 7 is an illustrative diagram illustrating an overview of a short distance determination process and a notification process in the image processing apparatus according to the present embodiment.

FIG. 7 is an illustrative diagram illustrating an overview of the short distance determination process and the notification process in the image processing apparatus according to the present embodiment.

If the user performs, for example, a gesture operation by hand as illustrated in A of FIG. 7, the image processing apparatus according to the present embodiment, for example, calculates the motion information indicating the motion of the object calculated from the captured image, as illustrated in B of FIG. 7. Here, in B of FIG. 7, for convenience of description, the calculated motion vector (motion information) is shown on the captured image.

Further, the image processing apparatus according to the present embodiment calculates an area of the region corresponding to a specific motion direction in the captured image based on the motion information.

More specifically, the image processing apparatus according to the present embodiment determines whether each calculated motion vector (motion information) satisfies, for example, the following Math. 1. Also, the image processing apparatus according to the present embodiment determines the motion vector satisfying the following Math. 1 among the calculated motion vectors (motion information), as a motion vector indicating a specific motion direction. Here, a reason for which the image processing apparatus according to the present embodiment determines the motion direction is that agitation of motion detection, for example, due to various processes such as Auto WB (White Balance) processing or Auto Gain processing or due to noise in the imaging device (imaging apparatus), is distinguished from the motion of the object. An influence of, for example, the noise can be removed by determining the motion direction. Further, the image processing apparatus according to the present embodiment, for example, may limit the specific motion direction, such as four directions including horizontal and vertical directions or two directions including either horizontal directions or vertical directions in advance, and determine a motion vector indicating the specific motion direction.

Here, "direction_size" shown in the following Math. 1 indicates a size of the motion vector and "direction_size_thres" shown in the following Math. 1 indicates a set threshold. Further, the threshold direction_size_thres may be, for example, a fixed value set in advance or may be a variable value that can be changed based on, for example, a user manipulation.

Further, a process according to the determination of the motion vector indicating the specific motion direction in the image processing apparatus according to the present embodiment is not limited to the process using the following Math. 1. For example, the image processing apparatus according to the present embodiment may determine a motion vector having a size equal to or greater than the threshold direction_size_thres as the motion vector indicating the specific motion direction.

$$\text{direction\_size} > \text{direction\_size\_thres} \qquad (\text{Math. 1})$$

If the motion vector indicating the specific motion direction is determined, the image processing apparatus according to the present embodiment calculates, for example, an area direction_ratio of a vector having the same motion direction in each specific motion direction.

If the area direction_ratio in each specific motion direction is calculated, the image processing apparatus according to the present embodiment determines, for example, whether each calculated area direction_ratio satisfies the following Math. 2. Also, if one of the calculated areas direction_ratio is determined to satisfy the following Math. 2, the image processing apparatus according to the present embodiment determines whether a distance between the object included in the captured image and the imaging apparatus is a short distance.

Here, "direction_ratio_thres" shown in the following Math. 2 indicates a set threshold. Further, an example of the threshold direction_ratio_thres may include a fixed value set in advance, but the threshold direction_ratio_thres according to the present embodiment is not limited thereto. For example, the threshold direction_ratio_thres according to the present embodiment may be a variable value that can be changed based on, for example, a user manipulation. Further, the threshold direction_ratio_thres according to the present embodiment may be set for each apparatus that performs a process related to gesture recognition or each application that performs a process related to gesture recognition based on a size in the motion direction or a used distance in the apparatus that performs a process related to gesture recognition or the application that performs a process related to gesture recognition.

Further, the process related to the determination as to whether the distance is a short distance in the image processing apparatus according to the present embodiment is not limited to a process using the following Math. 2. For example, when the area direction_ratio is equal to or greater than the threshold direction_ratio_thres, the image processing apparatus according to the present embodiment may determine whether the distance between the object included in the captured image and the imaging apparatus is a short distance.

$$\text{direction\_ratio} > \text{direction\_ratio\_thres} \quad \text{(Math. 2)}$$

For example, if the distance between the object and the imaging apparatus is determined to be a short distance through threshold processing based on the calculated area and a predetermined threshold as illustrated in Math. 2, the image processing apparatus according to the present embodiment notifies the user of a distance determination result, as illustrated in C of FIG. 7.

Here, the image processing apparatus according to the present embodiment, for example, notifies the user of the distance determination result using a visual notification method based on displaying of text such as "The distance is too short," shown in C of FIG. 7 on the display screen. Further, the notification method for the distance determination result in the image processing apparatus according to the present embodiment is not limited to the visual notification method. For example, the image processing apparatus according to the present embodiment may notify the user of the distance determination result using an auditory notification method using sound (including music, a beep or the like; the same applies hereinafter). Further, the image processing apparatus according to the present embodiment may notify the user of the distance determination result, for example, using a notification method that is a combination of the visual notification method and the auditory notification method.

Here, an example of a target that the image processing apparatus according to the present embodiment causes to perform the notification may include a display unit (which will be described below) or a sound output unit (which will be described below) included in the own apparatus (the image processing apparatus according to the present embodiment), and/or an external apparatus, such as an external display device or an external sound output device.

Figure 8:
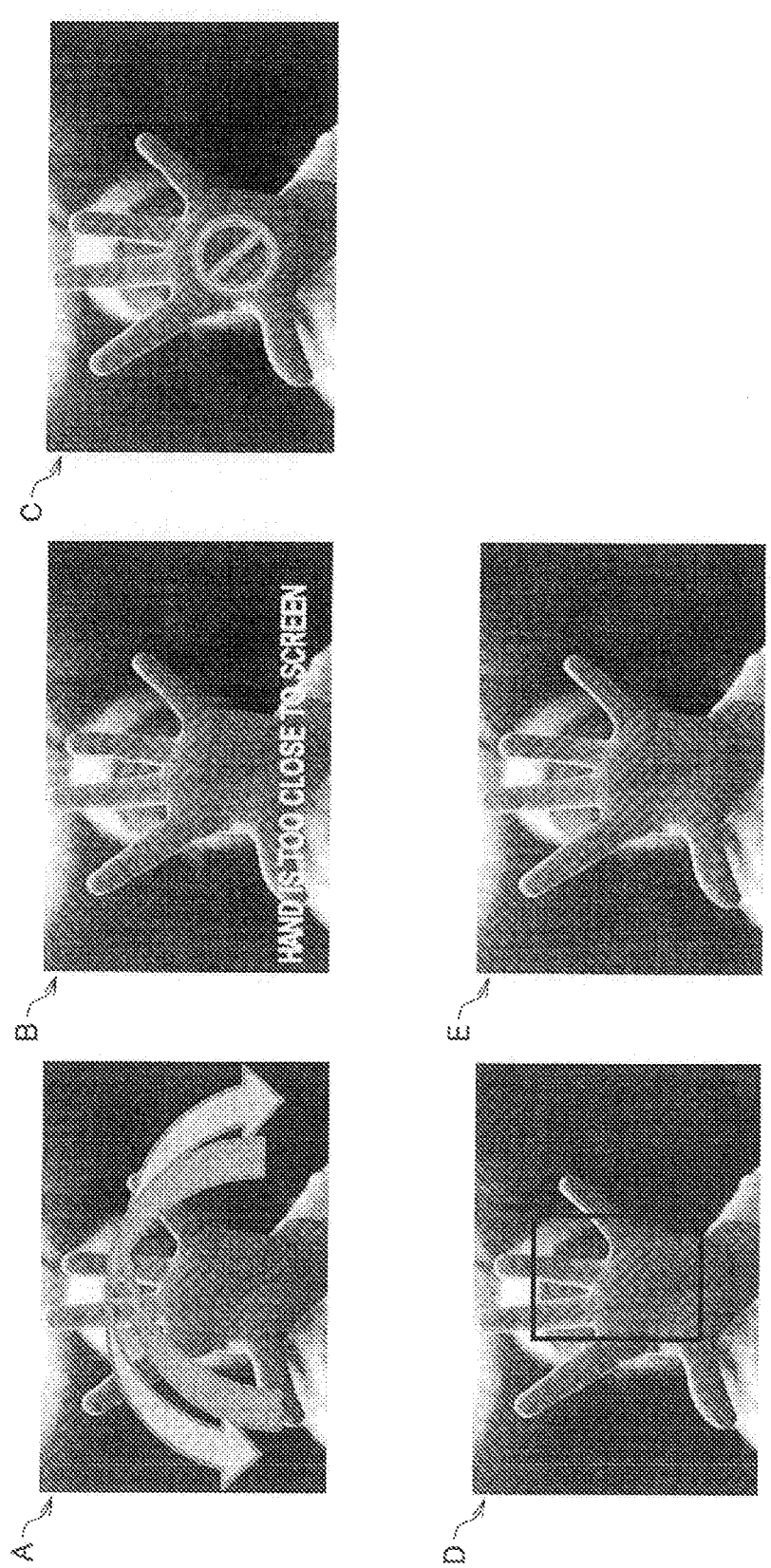
FIG. 8 is an illustrative diagram illustrating an example of the notification process in the image processing apparatus according to the present embodiment.

FIG. 8 is an illustrative diagram illustrating an example of the notification process in the image processing apparatus according to the present embodiment. Here, FIG. 8 illustrates an example of the notification according to the present embodiment when the user (manipulator) performs a gesture manipulation using his or her hand.

The image processing apparatus according to the present embodiment, for example, displays trajectories of the motion on the display screen based on the calculated motion information to notify of the distance determination result, as illustrated in A of FIG. 8. For example, as illustrated in A of FIG. 8, as the trajectories of the motion are displayed on the display screen, the user is able to visually confirm the operation direction of the his or her gesture operation. Further, when the image processing apparatus according to the present embodiment is performing the process (1) (image processing) and the process (2) (display control process), the user, for example, is able to visually recognize whether his or her gesture operation is recognized in the apparatus that performs a process related to gesture recognition.

Further, the image processing apparatus according to the present embodiment, for example, displays text on the display screen to notify of the distance determination result, as illustrated in B of FIG. 8. Here, the image processing apparatus according to the present embodiment, for example, calculates a position of a center of gravity in a region related to the object determined to be at a short distance (a region with motion), and displays the text in the calculation center position. Further, a position in which the image processing apparatus according to the present embodiment displays the text is not limited thereto. For example, the image processing apparatus according to the present embodiment may display the text in a position set in advance.

Further, the image processing apparatus according to the present embodiment, for example, displays an icon (e.g., a mark or a hand shape) on the display screen to notify of the distance determination result, as illustrated in C of FIG. 8. Here, the image processing apparatus according to the present embodiment displays the icon in a position within a region related to the object determined to be at a short distance (a region with motion). Further, a position in which the image processing apparatus according to the present embodiment displays the icon is not limited thereto. For example, the image processing apparatus according to the present embodiment may display the icon in a position of a center of gravity in the region related to the object determined to be at a short distance or may display the icon in a position set in advance.

Further, the image processing apparatus according to the present embodiment displays, for example, a rectangle having a size corresponding to the size of the motion on the display screen to notify of the distance determination result, as illustrated in D of FIG. 8. Here, the image processing apparatus according to the present embodiment displays, for example, the rectangle in a position within a region related to the object determined to be at a short distance (a region with motion). Further, the position in which the image processing apparatus according to the present embodiment displays, for example, the rectangle is not limited thereto. For example, the image processing apparatus according to the present embodiment may display the rectangle in a position of a center of gravity in the region related to the object determined to be at a short distance or may display the rectangle in a position set in advance.

Further, the image processing apparatus according to the present embodiment may notify of the distance determination result using sound, without using the notification method of displaying, for example, text, on the display screen, for example, as illustrated in E of FIG. 8.

The image processing apparatus according to the present embodiment notifies the user of the distance determination result using various notification methods, for example, as illustrated in FIG. 8.

Further, the notification according to the present embodiment is not limited to the example shown in FIG. 8. For example, when the image processing apparatus according to the present embodiment does not perform the process (1) (image processing) and the process (2) (display control process), the image processing apparatus according to the present embodiment does not display the combined image according to the process (1) (image processing) on the display screen, but displays a pointer manipulated according to a manipulation gesture on the display screen. Also, the image processing apparatus according to the present embodiment can notify the user of the distance determination result by displaying the captured image or the combined image according to the process (1) (image processing) on the display screen when the distance determination result indicates a short distance in the above case.

The image processing apparatus according to the present embodiment performs, for example, the short distance determination process (3) and the notification process (4) to determine whether the distance between the object with motion included in the captured image and the imaging device (the imaging apparatus) that has captured the captured image is a short distance based on the captured image, and selectively notify the user of the distance determination result when the distance is determined to be a short distance.

Here, the image processing apparatus according to the present embodiment determines whether the distance between the object with motion included in the captured image and the imaging device (imaging apparatus) is a short distance based on the motion vector (motion information) calculated from the captured image in the process (3) (short distance determination process). Accordingly, the image processing apparatus according to the present embodiment can determine whether the distance is a short distance even when the image processing apparatus according to the present embodiment is an apparatus that does not include a device capable of measuring the distance, as in the method for determining whether the distance is a short distance using a device capable of measuring the distance, such as an infrared sensor. Further, since the image processing apparatus according to the present embodiment determines whether the distance is a short distance based on the motion vector (motion information) calculated from the captured image, the image processing apparatus can determine whether the distance is a short distance regardless of an imaging condition in the imaging device, as in the method of determining whether the distance is a short distance based on the change in the luminance values of the captured image.

Accordingly, the image processing apparatus according to the present embodiment can selectively notify the user of a more accurate determination result for the distance between the object with motion included in the captured image and the imaging device (an imaging apparatus) that has captured the captured image.

Further, as the image processing apparatus according to the present embodiment selectively notifies of the distance determination result, the user can be aware, for example, of whether his or her gesture operation is performed at a short distance, or of a mistake in his or her gesture operation. Further, as the distance determination result is selectively notified of, an opportunity to guide the user to a more appropriate position for the gesture operation to be performed can be provided. Thus, the image processing apparatus according to the present embodiment can improve user convenience.

Further, the processes according to the image processing method according to the present embodiment in the image processing apparatus according to the present embodiment are not limited to "the process (1) (image processing) and the process (2) (display control process)" or "the process (3) (short distance determination process) and the process (4) (notification process)."

For example, the image processing apparatus according to the present embodiment may record data (e.g., the determination result data indicating the determination result or motion information corresponding to the determination result data) related to the process (3) (short distance determination process) on a recording medium, such as a storage unit (which will be described below) or an external recording medium (a recording process). When the data related to the process (3) (short distance determination process) is recorded on the external recording medium, the image processing apparatus according to the present embodiment transmits, for example, the data related to the process (3) (short distance determination process) and a record instruction to record the data, to the external recording medium. As the image processing apparatus according to the present embodiment records the data related to the process (3) (short distance determination process) on the recording medium, it is possible to realize, for example, an analysis system that performs a posteriori analysis of causes of the gesture operation not being recognized in the apparatus that performs a process related to gesture recognition or a monitoring system that detects a manipulation of a fixed imaging device (imaging apparatus) or tampering with the imaging device different from a normal motion in the imaging device.

Further, for example, when the distance is determined to be a short distance through the process (3) (short distance determination process), the image processing apparatus according to the present embodiment may perform a switching control process to execute another application. When the switching control process is performed, the process (3) (short distance determination process) serves as a switch that switches an application.

Further, in the above description, while the example in which the image processing apparatus according to the present embodiment performs the process (4) (notification process) has been shown, the image processing apparatus according to the present embodiment may not perform the process (4) (notification process). For example, the image processing apparatus according to the present embodiment may perform the recording process or the switching control process, instead of performing the process (4) (notification process).

Further, the image processing apparatus according to the present embodiment can perform, for example, processes that can be combined among the processes according to the image processing according to the present embodiment described above, such as "the process (1) (image processing) to the process (4) (notification process)" or "the process (1) (image processing) to the process (3) (short distance determination process)," as image processing according to the present embodiment.

Figure 9:
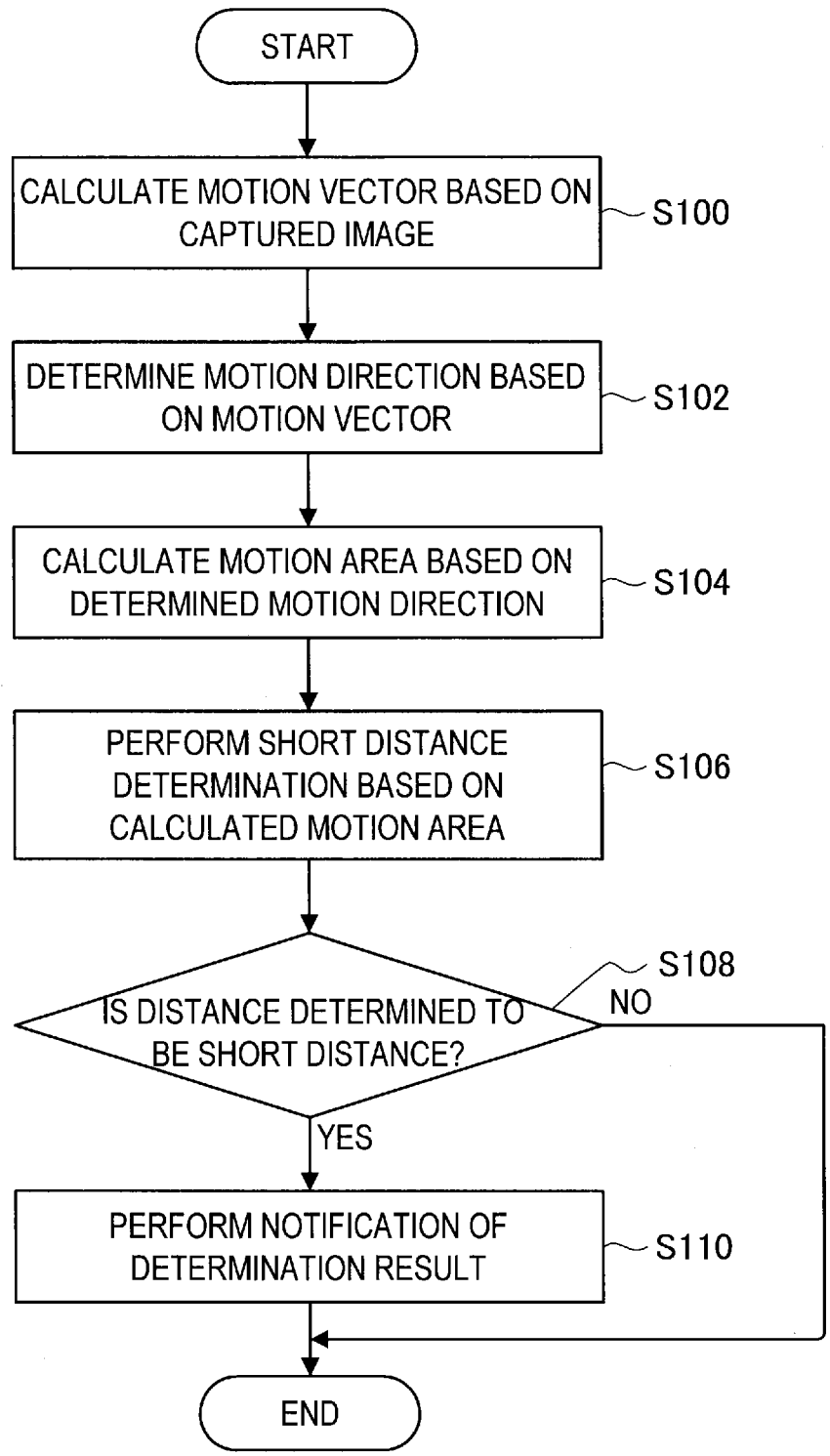
FIG. 9 is a flow diagram illustrating an example of image processing in the image processing apparatus according to the present embodiment.

FIG. 9 is a flow diagram illustrating an example of image processing in the image processing apparatus according to the present embodiment. Here, FIG. 9 illustrates an example of a process when the image processing apparatus according to the present embodiment performs the process (3) (short distance determination process) and the process (4) (notification process) as image processing according to the present embodiment. Further, in FIG. 9, for example, a process of steps S100 to S108 corresponds to the process (3) (short distance determination process), and step S110 corresponds to the process (4) (notification process).

The image processing apparatus according to the present embodiment calculates the motion vector (motion information) based on the captured image (S100).

The image processing apparatus according to the present embodiment determines a motion direction based on the motion vector calculated in step S100 (S102). The image processing apparatus according to the present embodiment determines, for example, a motion vector satisfying Math. 1, and determines the motion direction indicated by the motion vector satisfying Math. 1 as a specific motion direction. The process of step S102 corresponds to the process of determining the motion vector satisfying Math. 1 as the motion vector indicating the specific motion direction.

The image processing apparatus according to the present embodiment calculates a motion area based on the motion direction determined in step S102 (S104). The image processing apparatus according to the present embodiment, for example, calculates an area of the region corresponding to the motion vector having the same motion direction corresponding to the determined motion direction, and determines the calculated area as the motion area.

The image processing apparatus according to the present embodiment performs a short distance determination based on the calculated motion area (S108). The image processing apparatus according to the present embodiment determines, for example, whether each motion area calculated in step S104 satisfies Math. 2. Further, for example, if one of the motion areas calculated in step S104 is determined to satisfy Math. 2, the image processing apparatus according to the present embodiment determines that the distance between the object included in the captured image and the imaging apparatus is a short distance.

If the process of step S106 is performed, the image processing apparatus according to the present embodiment determines whether the distance is a short distance (S108).

If the distance is not determined to be a short distance in step S108, the image processing apparatus according to the present embodiment ends the image processing according to the present embodiment.

Further, if the distance is determined to be a short distance in step S108, the image processing apparatus according to the present embodiment notifies the user of the determination result (S110). Also, the image processing apparatus according to the present embodiment ends the image processing according to the present embodiment.

The image processing apparatus according to the present embodiment performs, for example, the process illustrated in FIG. 9 to realize the process (3) (short distance determination process) and the process (4) (notification process) according to the image processing method according to the present embodiment. Further, it is understood that the process according to the image processing method according to the present embodiment is not limited to the process illustrated in FIG. 9.

(Image Processing Apparatus According to the Present Embodiment)

Next, an example of a configuration of the image processing apparatus according to the present embodiment capable of performing the process according to the image processing method according to the present embodiment described above will be described.

Figure 10:
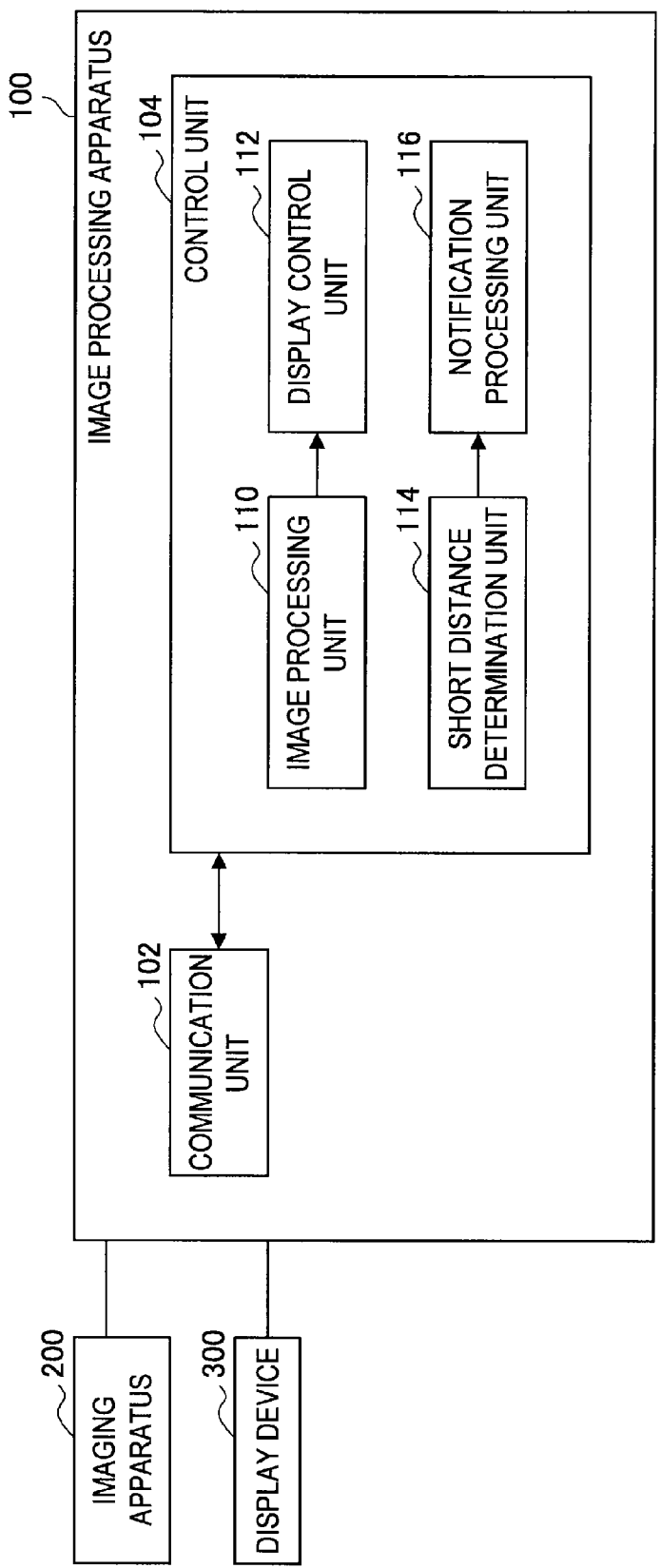
FIG. 10 is a block diagram illustrating an example of a configuration of the image processing apparatus according to the present embodiment.

FIG. 10 is a block diagram illustrating an example of a configuration of the image processing apparatus 100 according to the present embodiment. Here, in FIG. 10, an imaging apparatus 200 that performs imaging and a display device 300 capable of displaying an image on a display screen are shown together.

For example, the image processing apparatus 100 includes a communication unit 102 and a control unit 104.

Further, the image processing apparatus 100 may include, for example, a ROM (Read Only Memory; not shown), a RAM (Random Access Memory; not shown), a storage unit (not shown), a manipulation unit (not shown) that can be manipulated by the user, and a display unit (not shown) that displays various screens on a display screen. In the image processing apparatus 100, for example, the respective components are connected by a bus as a data transmission line.

Here, the ROM (not shown) stores a program or data for control such as calculation parameters, which is used by the control unit 104. The RAM (not shown) temporarily stores, for example, a program to be executed by the control unit 104.

The storage unit (not shown) is a storage device included in the image processing apparatus 100, and stores, for example, various data such as image data indicating the image to be displayed in the display region or the image to be displayed in the partial region of the display region, image data indicating the captured image, the data (e.g., determination result data indicating a determination result or motion information corresponding to the determination result data) related to process (3) (a short distance determination process), and applications. Here, examples of the storage unit (not shown) may include a magnetic recording medium such as a hard disk, and a non-volatile memory such as an EEPROM (Electrically Erasable and Programmable Read Only Memory) or a flash memory. Further, the storage unit (not shown) may be detachable from the image processing apparatus 100.

Further, the manipulation unit (not shown) may include a manipulation input device, which will be described below, and the display unit (not shown) may include a display device, which will be described below.

(Example of Hardware Configuration of Image Processing Apparatus 100)

Figure 11:
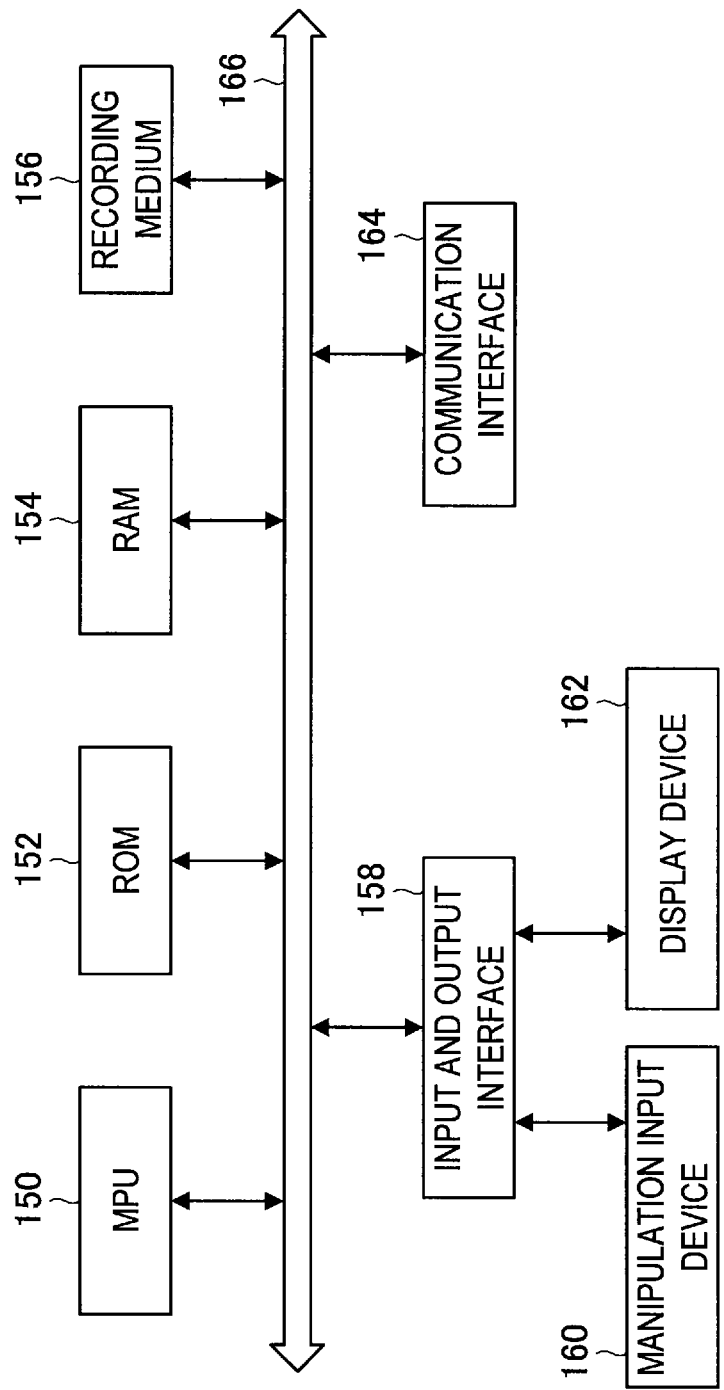
FIG. 11 is an illustrative diagram illustrating an example of a hardware configuration of the image processing apparatus according to the present embodiment.

FIG. 11 is an illustrative diagram illustrating an example of a hardware configuration of the image processing apparatus 100 according to the present embodiment. The image processing apparatus 100 includes, for example, an MPU 150, a ROM 152, a RAM 154, a recording medium 156, an input and output interface 158, a manipulation input device 160, a display device 162, and a communication interface 164. Further, in the image processing apparatus 100, the respective components are connected, for example, by a bus 166 as a data transmission path.

The MPU 150, for example, functions as the control unit 104 that includes an MPU (Micro Processing Unit) or various processing circuits, and controls the entire image processing apparatus 100. Further, in the image processing apparatus 100, the MPU 150 plays the role of, for example, the image processing unit 110, the display control unit 112, the short distance determination unit 114, and the notification processing unit 116, which will be described below.

The ROM 152 stores a program or data for control such as calculation parameters, which is used by the MPU 150. The RAM 154, for example, temporarily stores a program to be executed by the MPU 150.

The recording medium 156 functions as a storage unit (not shown), and stores, for example, various data such as image data indicating the image to be displayed in the display region or the image to be displayed in the partial region of the display region, image data indicating a captured image, data (e.g., determination result data indicating a determination result or motion information corresponding to the determination result data) related to the process (3)

(short distance determination process), or applications. Here, an example of the recording medium 156 may include a magnetic recording medium such as a hard disk or a nonvolatile memory such as a flash memory. Further, the recording medium 156 may be detachable from the image processing apparatus 100.

The input and output interface 158 connects, for example, the manipulation input device 160 or the display device 162. The manipulation input device 160 functions as a manipulation unit (not shown), and the display device 162 functions as a display unit (not shown). Here, examples of the input and output interface 158 may include a USB (Universal Serial Bus) terminal, a DVI (Digital Visual Interface) terminal, an HDMI (High-Definition Multimedia Interface) terminal, and various processing circuits. Further, the manipulation input device 160 is provided, for example, on the image processing apparatus 100 and connected to the input and output interface 158 inside the image processing apparatus 100. An example of the manipulation input device 160 may include buttons, direction keys, a rotary type selector such as a jog dial, or a combination thereof. Further, the display device 162 is provided, for example, on the image processing apparatus 100 and connected to the input and output interface 158 inside the image processing apparatus 100. An example of the display device 162 may include a liquid crystal display (LCD) or an organic EL display (organic ElectroLuminescence display; also known as an OLED display (Organic Light Emitting Diode display)).

Further, it is understood that the input and output interface 158 is connected to external devices, such as a manipulation input device (e.g., a keyboard or a mouse) and a display device, that are devices external to the image processing apparatus 100. Further, the display device 162 may be, for example, a device in which both display and user manipulation are possible, such as a touch screen.

The communication interface 164 is communication means included in the image processing apparatus 100 and functions as the communication unit 102 for performing wireless/wired communication with the imaging apparatus 200, the display device 300, or an external device such as a server via a network (or directly). Here, an example of the communication interface 164 may include a communication antenna and an RF (Radio Frequency) circuit (wireless communication), an IEEE802.15.1 port and a transmission and reception circuit (wireless communication), an IEEE802.11b port and a transmission and reception circuit (wireless communication), or a LAN (Local Area Network) terminal and a transmission and reception circuit (wired communication). Further, an example of the network according to the present embodiment may include a wired network such as a LAN or a WAN (Wide Area Network), a wireless network such as a wireless LAN (WLAN; Wireless Local Area Network) or a wireless WAN (WWAN; Wireless Wide Area Network) via a base station, or the Internet using a communication protocol, such as TCP/IP (Transmission Control Protocol/Internet Protocol).

The image processing apparatus 100 performs the process according to the image processing method according to the present embodiment, for example, through the configuration shown in FIG. 10.

Further, a hardware configuration of the image processing apparatus 100 according to the present embodiment is not limited to the configuration shown in FIG. 10. For example, the image processing apparatus 100 may include an imaging device serving as an imaging unit (not shown) that captures a still image or a moving image. If the imaging device is included, the image processing apparatus 100 can process, for example, the captured image that is generated by the imaging in the imaging device.

Here, examples of the imaging device according to the present embodiment may include a lens/imaging element and a signal processing circuit. The lens/imaging element includes, for example, a lens of an optical system, and an image sensor using a plurality of CMOS (Complementary Metal Oxide Semiconductor) imaging elements. Further, the signal processing circuit includes, for example, an AGC (Automatic Gain Control) circuit or an ADC (Analog to Digital Converter), and converts an analog signal generated by the imaging element into a digital signal (image data) to perform various signal processing. Examples of signal processing performed by the signal processing circuit may include a white balance correction process, a tint correction process, a gamma correction process, a YCbCr conversion process, and an edge enhancement process.

Further, the image processing apparatus 100 may further include, for example, a DSP (Digital Signal Processor) and a sound output device, which serve as a sound output unit (not shown) that outputs sound. An example of the sound output device according to the present embodiment may include an amplifier and a speaker. When the DSP and the sound output device are further included, the image processing apparatus 100 can notify the user of the distance determination result in the process (3) (the short distance determination process) using the sound output from the sound output device.

Further, when the image processing apparatus 100 has, for example, a configuration that performs processing in a stand-alone manner, the image processing apparatus 100 may not include the communication device 164. Further, the image processing apparatus 100 may have a configuration in which the manipulation device 160 or the display device 162 is not included.

Referring to FIG. 10 again, an example of the configuration of the image processing apparatus 100 will be described. The communication unit 102 is communication means included in the image processing apparatus 100, and performs wireless/wired communication with the imaging apparatus 200, the display device 300, or an external device such as a server via the network (or directly). Further, communication of the communication unit 102 is controlled, for example, by the control unit 104. Here, the communication unit 102 may include, for example, a communication antenna and an RF circuit or a LAN terminal and a transmission and reception circuit, but the configuration of the communication unit 102 is not limited thereto. For example, the communication unit 102 may have a configuration corresponding to any standard in which communication is possible, such as a USB terminal and a transmission and reception circuit, or may have any configuration capable of communication with an external device via a network.

The control unit 104 includes, for example, an MPU, and serves to control the entire image processing apparatus 100. Further, the control unit 104 includes, for example, the image processing unit 110, the display control unit 112, the short distance determination unit 114, and the notification processing unit 116, and plays a leading role in performing the process according to the image processing method according to the present embodiment.

The image processing unit 110 plays a leading role in the process (1) (image processing), and combines the image to be displayed in the display region or the image to be displayed in the partial region of the display region with the captured image. Further, the image processing unit 110, for example, may change a degree of visualization of the captured image and combine the captured image whose degree of visualization has been changed with the image to be displayed in the display region or the image to be displayed in the partial region of the display region.

The display control unit 112 plays a leading role in the process (2) (display control process), and displays the image combined by the image processing unit 110 on the display screen.

The short distance determination unit 114 plays a leading role in the process (3) (short distance determination process) and determines whether the distance between an object with motion included in the captured image and the imaging apparatus that has captured the captured image (e.g., the imaging apparatus 200 or an imaging unit (not shown)) is a short distance based on the captured image. The short distance determination unit 114, for example, calculates an area of the region corresponding to a specific motion direction in the captured image based on the motion information indicating the motion of the object calculated based on the captured image. Also, the short distance determination unit 114 determines whether the distance between the object and the imaging apparatus is a short distance based on the calculated area and the predetermined threshold.

The notification processing unit 116 plays a leading role in the process (4) (notification process), and selectively notifies the user of the distance determination result based on the distance determination result in the short distance determination unit 114. Here, for example, if the short distance determination unit 114 determines that the distance is a short distance, the notification processing unit 116 notifies the user of the distance determination result. Further, for example, if the short distance determination unit 114 does not determine that the distance is a short distance, the notification processing unit 116 does not notify the user of the distance determination result.

As the control unit 104 includes, for example, the image processing unit 110, the display control unit 112, the short distance determination unit 114, and the notification processing unit 116, the control unit 104 plays a leading role in the processes according to the image processing method according to the present embodiment (e.g., the process (1) (image processing) to the process (4) (notification process)).

Further, the configuration of the control unit according to the present embodiment is not limited to the configuration shown in FIG. 10. For example, the control unit according to the present embodiment may further include a recording processing unit that performs a recording process (not shown) and/or a switching control processing unit (not shown) that performs a switching control process. Further, the control unit according to the present embodiment may further include, for example, a gesture recognition processing unit (not shown) that recognizes a gesture manipulation in the display region with which the captured image has been combined or the partial region of the display region with which the captured image has been combined, and performs a process related to the gesture recognition corresponding to the recognized gesture manipulation.

Further, the control unit according to the present embodiment may have, for example, a configuration in which the notification processing unit 116 is not included. When the control unit has the above configuration, the image processing apparatus according to the present embodiment performs, for example, the process (1) (image processing) to the process (3) (short distance determination process) as the processes according to the image processing method according to the present embodiment.

Further, the control unit according to the present embodiment may have, for example, a configuration in which the short distance determination unit 114 and the notification processing unit 116 are not included. When the control unit has the above configuration, the image processing apparatus according to the present embodiment performs, for example, the process (1) (image processing) and the process (2) (display control process) as the processes according to the image processing method according to the present embodiment.

Further, the control unit according to the present embodiment may have, for example, a configuration in which the image processing unit 110 and the display control unit 112 are not included. When the control unit has the above configuration, the image processing apparatus according to the present embodiment performs, for example, the process (3) (short distance determination process) and the process (4) (notification process) as the processes according to the image processing method according to the present embodiment.

The image processing apparatus 100 performs, for example, the process according to the image processing method according to the present embodiment (e.g., the process (1) (image processing) to the process (4) (notification process)) using the configuration shown in FIG. 10. Accordingly, the image processing apparatus 100, for example, can feedback the gesture operation to the user using the configuration shown in FIG. 10. Further, the image processing apparatus 100, for example, can selectively notify the user of a more accurate determination result for the distance between an object with motion included in the captured image and the imaging apparatus that has captured the captured image (e.g., the imaging apparatus 200 or an imaging unit (not shown)) using the configuration shown in FIG. 10.

Further, the configuration of the image processing apparatus according to the present embodiment is not limited to the configuration shown in FIG. 10. For example, the image processing apparatus according to the present embodiment may individually include one or two or more of the respective units constituting the control unit according to the present embodiment (e.g., realize each unit as an individual processing circuit).

Further, the image processing apparatus according to the present embodiment may include, for example, an imaging unit (not shown). If the image processing apparatus includes the imaging unit (not shown), the image processing apparatus according to the present embodiment can process a captured image generated by the imaging in the imaging unit (not shown).

Further, the image processing apparatus according to the present embodiment may include, for example, a display unit (not shown). If the image processing apparatus includes the display unit (not shown), the image processing apparatus according to the present embodiment, for example, may display the image combined by the image processing unit 110 on a display screen of the display unit (not shown). If the image processing apparatus includes the display unit (not shown), the image processing apparatus according to the present embodiment, for example, can visually notify the user of the determination result in the short distance determination unit 114 as illustrated in A to D of FIG. 8, using the display screen of the display unit (not shown).

Further, the image processing apparatus according to the present embodiment may include, for example, a sound output unit (not shown) capable of outputting sound. When the image processing apparatus includes the sound output unit (not shown), the image processing apparatus according to the present embodiment can notify the user of the determination result in the short distance determination unit 114 using the sound output by the sound output unit (not shown).

Further, when the image processing apparatus according to the present embodiment has, for example, a configuration that performs processing in a stand-alone manner, the image processing apparatus may not include the communication unit 102.

As described above, the image processing apparatus according to the present embodiment performs, for example, the process (1) (region setting process) and the process (2) (image processing) as the processes according to the image processing method according to the present embodiment. The image processing apparatus according to the present embodiment combines the image to be displayed in the display region corresponding to the entire display screen or the image to be displayed in the partial region of the display region with the captured image in the process (1) (image processing). Also, the combined image is displayed on the display screen through the process (2) (display control process).

Here, when the image processing apparatus according to the present embodiment combines the image to be displayed in the display region corresponding to the entire display screen with the captured image in the process (1) (image processing), the image processing apparatus according to the present embodiment can feedback the gesture operation to the user using the entire display screen. Further, when the image processing apparatus according to the present embodiment combines the image to be displayed in the partial region of the display region with the captured image in the process (1) (image processing), the image processing apparatus according to the present embodiment can feedback the gesture operation to the user using a portion of the display screen.

Accordingly, the image processing apparatus according to the present embodiment can feedback the gesture operation to the user.

Further, the image processing apparatus according to the present embodiment can perform, for example, the process (3) (short distance determination process) and the process (4) (notification process) as the processes according to the image processing method according to the present embodiment. When the image processing apparatus performs the process (3) (short distance determination process) and the process (4) (notification process), the image processing apparatus according to the present embodiment determines whether the distance between the object with motion included in the captured image and the imaging device (an imaging apparatus) that has captured the captured image is a short distance based on the captured image, and selectively notifies the user of the distance determination result when the distance is determined to be a short distance.

Here, the image processing apparatus according to the present embodiment determines whether the distance between the object with motion included the captured image and the imaging device (imaging apparatus) is a short distance based on the motion vector (motion information) calculated from the captured image in the process (3) (short distance determination process). Accordingly, the image processing apparatus according to the present embodiment can determine whether the distance is a short distance even when the image processing apparatus according to the present embodiment is an apparatus that does not include the device capable of measuring a distance, as in the method for determining whether the distance is a short distance using a device capable of measuring a distance, such as an infrared sensor. Further, since the image processing apparatus according to the present embodiment determines whether the distance is a short distance based on the motion vector (motion information) calculated from the captured image, the image processing apparatus according to the present embodiment can determine whether the distance is a short distance regardless of an imaging condition in the imaging device, as in the method of determining whether the distance is a short distance based on the change in the luminance value of the captured image.

Accordingly, the image processing apparatus according to the present embodiment can selectively notify the user of a more accurate determination result for the distance between the object with motion included in the captured image and the imaging apparatus that has captured the captured image.

The image processing apparatus has been described above as the present embodiment, but the present embodiment is not limited to such a form. The present embodiment may be applied to, for example, a variety of devices capable of processing an image, such as a communication device such as a mobile phone or a smartphone or a video/music player device (or a video/music recording and reproducing device), a game machine, a computer such as a PC (Personal Computer) or a server, a display device such as a television receiver, or an imaging apparatus such as a digital camera. Further, the present embodiment may be applied to, for example, a processing IC (Integrated Circuit) that can be incorporated into such devices.

Further, the process according to the image processing method according to the present embodiment may be realized by an image processing system including a plurality of devices on the assumption of a connection to the network (or communication between respective devices) such as, for example, cloud computing.

(Program According to the Present Embodiment)

A program for causing a computer to function as the image processing apparatus according to the present embodiment (e.g., a program capable of executing the process according to the image processing method according to the present embodiment, such as "the process (1) (region setting process) and the process (2) (image processing)," "the process (1) (region setting process) to the process (3) (short distance determination process)," or "the process (1) (region setting process) to the process (4) (notification process)) is executed in the computer, thereby feeding back the gesture operation to the user.

Further, a program for causing a computer to function as the image processing apparatus according to the present embodiment (e.g., a program capable of executing the process according to the image processing method according to the present embodiment, such as "the process (3) (short distance determination process) and the process (4) (notification process)" or "the process (1) (region setting process) to the process (4) (notification process))" is executed in the computer, thereby selectively notifying the user of a more accurate determination result for the distance between the object with motion included in the captured image and the imaging apparatus that has captured the captured image.

The preferred embodiments of the present disclosure have been described above in detail with reference to the accompanying drawings, but a technical scope of the present disclosure is not limited to such examples. It is understood by those skilled in the art that various alternations or modifications may occur without departing from the scope of the technical ideas described in the claims and are included the technical scope of the present disclosure.

For example, while in the above description, provision of the program (computer program) for causing the computer to function as the image processing apparatus according to the present embodiment has been shown, the present embodiment may further provide a recording medium having the program stored thereon.

The configuration described above is an example of the present embodiment and, of course, is within the technical scope of the present disclosure.

Additionally, the present technology may also be configured as below.

(1)

An image processing apparatus including:

an image processing unit that combines an image to be displayed in a display region corresponding to an entire display screen or an image to be displayed in a partial region of the display region with a captured image for feeding back a gesture operation to a user; and a display control unit that displays the combined image on the display screen.

(2)

The image processing apparatus according to (1), wherein a manipulation target object to be manipulated according to a result of gesture recognition is included in the image to be displayed in the display region and the image to be displayed in the partial region of the display region, and wherein the image processing unit does not combine the captured image in a region in which the manipulation target object is arranged.

(3)

The image processing apparatus according to (1) or (2), wherein the image processing unit detects a recognition target object to be subjected to gesture recognition from the captured image, and arranges a manipulation target object to be manipulated according to a result of the gesture recognition in the image to be displayed in the display region with which the captured image is combined or the image to be displayed in the partial region of the display region with which the captured image is combined based on a position of the detected recognition target object.

(4)

The image processing apparatus according to any one of (1) to (3), wherein the image processing unit detects a recognition target object to be subjected to gesture recognition from the captured image, and newly arranges a manipulation target object to be manipulated according to a result of the gesture recognition in the image to be displayed in the display region or the image to be displayed in the partial region of the display region based on a motion of the detected recognition target object.

(5)

The image processing apparatus according to any one of (1) to (4), wherein the image processing unit changes a degree of visualization of the captured image and combines the captured image whose degree of visualization has been changed with the image to be displayed in the display region corresponding to the entire display screen or the image to be displayed in the partial region of the display region.

(6)

The image processing apparatus according to any one of (1) to (5), further including:

a short distance determination unit that determines whether a distance between an object with motion included in the captured image and an imaging apparatus that has captured the captured image is a short distance based on the captured image; and a notification processing unit that selectively notifies the user of a distance determination result based on the distance determination result.

(7)

The image processing apparatus according to (6), wherein the short distance determination unit calculates an area of a region corresponding to a specific motion direction in the captured image based on motion information indicating the motion of the object calculated based on the captured image, and determines whether a distance between the object and the imaging apparatus is a short distance based on the calculated area and a predetermined threshold, and wherein the notification processing unit notifies the user of the distance determination result when the distance is determined to be a short distance.

(8)

A program for causing a computer to function as a unit configured to combine an image to be displayed in a display region corresponding to an entire display screen or an image to be displayed in a partial region of the display region with a captured image for feeding back a gesture operation to a user, and a unit configured to display the combined image on the display screen.

(9) An information processing system including: circuitry configured to:

acquire image data corresponding to a target object that is a target for gesture recognition captured by an imaging device; determine whether a distance between the target object and the imaging device is inadequate for recognition of a gesture made by the target object; and output a notification when the determining determines that the distance between the target object and the imaging device is inadequate for recognition of a gesture made by the target object.

(10)

The information processing system of (9), wherein the circuitry is configured to determine the distance between the target object and the imaging device based on the acquired image data.

(11)

The information processing system of (9), wherein the circuitry is configured to determine the distance between the target object and the imaging device based on an output of a sensor configured to detect a distance between the sensor and the target object.

(12)

The information processing system of any of (9) to (11), wherein the circuitry is configured to determine that the distance between the target object and the imaging device is inadequate for recognition of a gesture made by the target object when the distance is too small to recognize a gesture made by the target object.

(13)

The information processing system of any of (9) to (12), wherein the circuitry is configured to: determine the distance between the target object and the imaging device; compare the distance to a predetermined threshold value; and determine that the distance between the target object and the imaging device is inadequate for recognition of a gesture made by the target object when the distance is less than the predetermined threshold value.

(14)

The information processing system of any of (9) to (13), wherein the circuitry is configured to: calculate, based on the acquired image data, motion information corresponding to motion of the target object.

(15)

The information processing system of (14), wherein the motion information calculated by the circuitry is a motion vector corresponding to the target object.

(16)

The information processing system of any of (14) to (15), wherein the circuitry is configured to: determine whether the distance between the target object and the imaging device is inadequate for recognition of a gesture made by the target object based on the calculated motion information corresponding to the target object.

(17)

The information processing system of any of (14) to (16), wherein the circuitry is configured to: determine that the distance between the target object and the imaging device is inadequate for recognition of a gesture made by the target object when the motion information indicates that the distance is too small to recognize a gesture made by the target object.

(18)

The information processing system of any of (14) to (17), wherein the circuitry is configured to: control a display to display the acquired image data and graphic notification corresponding to a trajectory of the motion of the target image based on the motion information.

(19) The information processing system of any of (9) to (18), wherein the circuitry is configured to: control a display to display, as the notification, a graphic notification indicating that the distance between the target object and the imaging device is inadequate for recognition of a gesture made by the target object.

(20)

The information processing system of (12), wherein the circuitry is configured to: control a display to display, as the notification, a graphic notification indicating that the distance between the target object and the imaging device is too small to recognize a gesture made by the target object.

(21)

The information processing system of any of (9) to (20), wherein the circuitry is configured to: control a display to display the acquired image data and, as the notification, a graphic notification superimposed on the target object included in the displayed acquired image data.

(22)

The information processing system of (21), wherein the circuitry is configured to: control the display to display, as the notification, a graphic notification superimposed on the target object included in the displayed acquired image data.

(23)

The information processing system of (22), wherein the circuitry is configured to: control the display to display the notification at a position corresponding to a center of gravity of the target object included in the displayed acquired image data.

(24)

The information processing system of (12), wherein the circuitry is configured to: control a display to display the acquired image data and, as the notification, a graphic notification superimposed on the target object indicating that the distance between the target object and the imaging device is too small to recognize a gesture made by the target object.

(25)

The information processing system of (14), wherein the circuitry is configured to: control a display to display, as the notification, a graphic notification corresponding to the motion information indicating that the distance between the target object and the imaging device is inadequate for recognition of a gesture made by the target object.

(26)

The information processing system of (9), wherein the circuitry is configured to: control a speaker to output a sound as the notification.

(27) A method performed by information processing system, the method including: acquiring, by circuitry of the information processing system, image data corresponding to a target object that is a target for gesture recognition captured by an imaging device; determining, by the circuitry, whether a distance between the target object and the imaging device is inadequate for recognition of a gesture made by the target object; and outputting, by the circuitry, a notification when the determining determines that the distance between the target object and the imaging device is inadequate for recognition of a gesture made by the target object.

(28)

A non-transitory computer-readable medium including computer-program instruction, which when executed by an information processing system, cause the information processing system to: acquire image data corresponding to a target object that is a target for gesture recognition captured by an imaging device; determine whether a distance between the target object and the imaging device is inadequate for recognition of a gesture made by the target object; and output a notification when the determining determines that the distance between the target object and the imaging device is inadequate for recognition of a gesture made by the target object.

REFERENCE SIGNS LIST

100 Image processing apparatus
102 Communication unit
104 Control unit
110 Image processing unit
112 Display control unit
114 Short distance determination unit
116 Notification processing unit
200 Imaging apparatus
300 Display device

The invention claimed is:

1. An information processing system comprising:
circuitry configured to:
  acquire image data corresponding to a target object that is a target for gesture recognition captured by an imaging device;
  determine whether a distance between the target object and the imaging device is inadequate for recognition of a gesture made by the target object; and
  output a notification when the determining determines that the distance between the target object and the imaging device is inadequate for recognition of a gesture made by the target object, wherein
the circuitry is further configured to
determine the distance between the target object and the imaging device; and
compare the distance to a predetermined threshold value, and
the circuitry is configured to determine that the distance between the target object and the imaging device is inadequate for recognition of a gesture made by the target object when the distance is less than the predetermined threshold value.

2. The information processing system of claim 1, wherein the circuitry is configured to determine the distance between the target object and the imaging device based on the acquired image data.

3. The information processing system of claim 1, wherein the circuitry is configured to determine the distance between the target object and the imaging device based on an output of a sensor configured to detect a distance between the sensor and the target object.

4. The information processing system of claim 1, wherein the circuitry is configured to:
calculate, based on the acquired image data, motion information corresponding to motion of the target object.

5. The information processing system of claim 4, wherein the motion information calculated by the circuitry is a motion vector corresponding to the target object.

6. The information processing system of claim 4, wherein the circuitry is configured to:
determine whether the distance between the target object and the imaging device is inadequate for recognition of a gesture made by the target object based on the calculated motion information corresponding to the target object.

7. The information processing system of claim 4, wherein the circuitry is configured to:
determine that the distance between the target object and the imaging device is inadequate for recognition of a gesture made by the target object when the motion information indicates that the distance is too small to recognize a gesture made by the target object.

8. The information processing system of claim 4, wherein the circuitry is configured to:
control a display to display the acquired image data and a graphic notification corresponding to a trajectory of the motion of the target image based on the motion information.

9. The information processing system of claim 1, wherein the circuitry is configured to:
control a display to display, as the notification, a graphic notification indicating that the distance between the target object and the imaging device is inadequate for recognition of a gesture made by the target object.

10. The information processing system of claim 1, wherein the circuitry is configured to:
control a display to display, as the notification, a graphic notification indicating that the distance between the target object and the imaging device is too small to recognize a gesture made by the target object.

11. The information processing system of claim 1, wherein the circuitry is configured to:
control a display to display the acquired image data and, as the notification, a graphic notification superimposed on the displayed acquired image data based on a position of the target object included in the displayed acquired image data.

12. The information processing system of claim 11, wherein the circuitry is configured to:
control the display to display, as the notification, the graphic notification superimposed on the target object included in the displayed acquired image data.

13. The information processing system of claim 12, wherein the circuitry is configured to:
control the display to display the notification at a position corresponding to a center of the target object included in the displayed acquired image data.

14. The information processing system of claim 1, wherein the circuitry is configured to:
control a display to display the acquired image data and, as the notification, a graphic notification superimposed on the target object indicating that the distance between the target object and the imaging device is too small to recognize a gesture made by the target object.

15. The information processing system of claim 4, wherein the circuitry is configured to:
control a display to display, as the notification, a graphic notification corresponding to the motion information indicating that the distance between the target object and the imaging device is inadequate for recognition of a gesture made by the target object.

16. The information processing system of claim 1, wherein the circuitry is configured to:
control a speaker to output a sound as the notification.

17. A method performed by information processing system, the method comprising:
acquiring, by circuitry of the information processing system, image data corresponding to a target object that is a target for gesture recognition captured by an imaging device;
determining, by the circuitry, whether a distance between the target object and the imaging device is inadequate for recognition of a gesture made by the target object; and
outputting, by the circuitry, a notification when the determining determines that the distance between the target object and the imaging device is inadequate for recognition of a gesture made by the target object, wherein the method further comprising
determining the distance between the target object and the imaging device; and
comparing the distance to a predetermined threshold value, and
the determining determines that the distance between the target object and the imaging device is inadequate for recognition of a gesture made by the target object when the distance is less than the predetermined threshold value.

18. A non-transitory computer-readable medium including computer-program instruction, which when executed by an information processing system, cause the information processing system to:
acquire image data corresponding to a target object that is a target for gesture recognition captured by an imaging device;
determine whether a distance between the target object and the imaging device is inadequate for recognition of a gesture made by the target object; and
output a notification when the determining determines that the distance between the target object and the imaging device is inadequate for recognition of a gesture made by the target object, wherein
the computer-program instruction further causes the information processing system to
determine the distance between the target object and the imaging device; and
compare the distance to a predetermined threshold value, and
the information processing system determines that the distance between the target object and the imaging device is inadequate for recognition of a gesture made by the target object when the distance is less than the predetermined threshold value.

* * * * *